(12) United States Patent
Lei et al.

(10) Patent No.: US 11,937,235 B2
(45) Date of Patent: Mar. 19, 2024

(54) SLOT FORMAT INDICATOR (SFI) ENHANCEMENT FOR SUB-BAND FULL-DUPLEX

(71) Applicant: QUALCOMM Incorporated, San Diego, CA (US)

(72) Inventors: Jing Lei, San Diego, CA (US); Huilin Xu, Temecula, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/362,823

(22) Filed: Jun. 29, 2021

(65) Prior Publication Data
US 2022/0007395 A1 Jan. 6, 2022

Related U.S. Application Data

(60) Provisional application No. 63/047,873, filed on Jul. 2, 2020.

(51) Int. Cl.
*H04W 4/00* (2018.01)
*H04L 1/00* (2006.01)
(Continued)

(52) U.S. Cl.
CPC ....... *H04W 72/1268* (2013.01); *H04L 1/0061* (2013.01); *H04L 5/1423* (2013.01);
(Continued)

(58) Field of Classification Search
None
See application file for complete search history.

(56) References Cited

U.S. PATENT DOCUMENTS

2017/0366199 A1* 12/2017 Ge .................. H04L 1/0057
2019/0268903 A1   8/2019 Lee et al.
(Continued)

FOREIGN PATENT DOCUMENTS

EP        3668215 A1    6/2020
WO    2017215486 A1   12/2017

OTHER PUBLICATIONS

International Search Report and Written Opinion—PCT/US2021/039997—ISA/EPO—dated Oct. 22, 2021.

*Primary Examiner* — Zewdu A Beyen
(74) *Attorney, Agent, or Firm* — Loza & Loza, LLP

(57) ABSTRACT

Aspects relate to dynamically changing the slot format of a slot between half-duplex and sub-band full-duplex and/or to changing flexible symbols within a flexible slot between half-duplex and sub-band full-duplex when a base station is configured to operate in a sub-band full-duplex mode. A slot format indicator (SFI) indicating the slot format of the slot may be signaled, for example, via downlink control information (DCI) mapped to a downlink control channel or medium access control (MAC) control element (MAC-CE) mapped to a downlink data channel. To improve reliability, various SFI boosting mechanisms may further be employed. For example, the base station may apply a higher aggregation level to the SFI, transmit repetitions of the SFI across multiple beams, apply a CRC enhancement and/or MCS enhancement to the downlink control channel carrying the SFI, and/or apply a power boost to the SFI.

28 Claims, 21 Drawing Sheets

(51) Int. Cl.
*H04L 5/14* (2006.01)
*H04L 5/16* (2006.01)
*H04W 72/0446* (2023.01)
*H04W 72/0453* (2023.01)
*H04W 72/1268* (2023.01)
*H04W 72/23* (2023.01)
*H04W 72/53* (2023.01)
*H04W 80/02* (2009.01)

(52) U.S. Cl.
CPC ........... *H04L 5/16* (2013.01); *H04W 72/0446* (2013.01); *H04W 72/0453* (2013.01); *H04W 72/23* (2023.01); *H04W 72/53* (2023.01); *H04W 80/02* (2013.01)

(56) References Cited

U.S. PATENT DOCUMENTS

2019/0349180 A1* 11/2019 Lu ...................... H04L 27/2607
2020/0052802 A1*  2/2020 Ryu .................... H04B 17/309
2020/0260417 A1    8/2020 Jo et al.

* cited by examiner

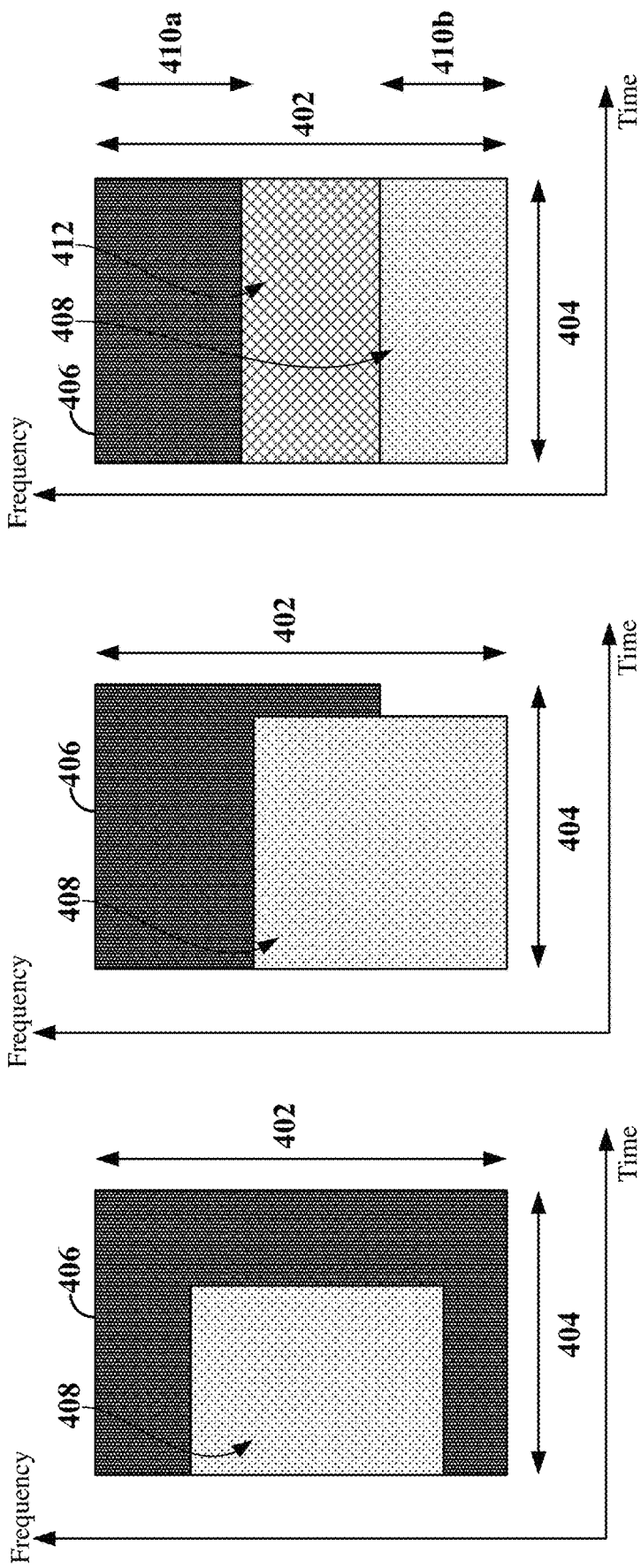

SLOT FORMAT INDICATOR (SFI) ENHANCEMENT FOR SUB-BAND FULL-DUPLEX

CROSS-REFERENCE TO RELATED APPLICATIONS

The present application for patent claims priority to and the benefit of U.S. Provisional Application No. 63/047,873, filed Jul. 2, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to slot format change in sub-band full-duplex wireless communication networks.

INTRODUCTION

In wireless communication systems, such as those specified under standards for 5G New Radio (NR), an access point (e.g., a base station) may communicate with a user equipment (UE) (e.g., a smartphone). The communication can utilize various duplexing modes. For example, each of the base station (e.g., gNodeB (gNB)) and the UE can operate in a half-duplex mode or a full-duplex mode. In half-duplex mode, downlink and uplink transmissions occur at different times. In some examples, half-duplex communication may utilize time division duplex (TDD) in which transmissions in different directions on a given channel are separated from one another using time division multiplexing. In full-duplex mode, downlink and uplink transmissions may occur simultaneously. In some examples, full-duplex communication may utilize frequency division duplex (FDD) in paired spectrum, in which transmissions in different directions occur at different carrier frequencies. In other examples, full-duplex communication may utilize sub-band FDD in unpaired spectrum, in which the transmissions in different directions are carried in different sub-bands of a carrier bandwidth (or a BWP of the carrier bandwidth).

In the time domain, communication may be time-divided into slots. Each slot may carry, for example, 7 or 14 symbols (e.g., orthogonal frequency division multiplexed (OFDM) symbols). The network may configure each slot as a downlink slot (e.g., all symbols are dedicated for downlink communication), an uplink slot (e.g., all symbols are dedicated for uplink communication), or a flexible slot. A flexible slot can include symbols that may be classified as uplink symbols, downlink symbols, or flexible symbols that may be configured as uplink or downlink symbols. NR TDD uses a flexible slot configuration. The slot format of each slot in a cell may be static or may be configured in a semi-static or dynamic manner. For example, the flexible symbols in a slot may be dynamically reconfigured using a slot format indicator (SFI) transmitted via downlink control information (DCI) within a physical downlink control channel (PDCCH).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a base station in a wireless communication network is disclosed. The method includes selecting a slot format of a slot having a carrier bandwidth. The slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The method further includes transmitting a slot format indicator indicating the slot format of the slot to a plurality of user equipment (UEs) within downlink control information or a medium access control (MAC) control element (MAC-CE).

Another example provides a base station in a wireless communication network. The base station includes a wireless transceiver configured for communicating with a plurality of user equipment (UEs) over a carrier bandwidth, a memory, and a processor communicatively coupled to the wireless transceiver and the memory. The processor and the memory can be configured to select a slot format of a slot having a carrier bandwidth. The slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The processor and the memory can further be configured to transmit a slot format indicator indicating the slot format of the slot to a plurality of user equipment (UEs) via the wireless transceiver within downlink control information or a medium access control (MAC) control element (MAC-CE).

Another example provides a base station in a wireless communication network. The base station includes means for selecting a slot format of a slot having a carrier bandwidth. The slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The base station further includes means for transmitting a slot format indicator indicating the slot format of the slot to a plurality of user equipment (UEs) within downlink control information or a medium access control (MAC) control element (MAC-CE).

Another example provides a non-transitory computer-readable medium having stored therein instructions executable by one or more processors of a base station to select a slot format of a slot comprising a carrier bandwidth. The slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The non-transitory computer-readable medium further includes instructions executable by one or more processors of the base station to transmit a slot format indicator indicating the slot format of the slot to a plurality of user equipment (UEs) within downlink control information or a medium access control (MAC) control element (MAC-CE).

According to another example, a method of wireless communication at a user equipment in a wireless communication network is disclosed. The method includes receiving, from a base station, a slot format indicator within downlink control information or a medium access control (MAC) control element (MAC-CE). The slot format indicator can indicate a slot format of a slot having a carrier bandwidth, and the slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The method further includes communicating with the base station in the slot based on the slot format.

Another example provides a user equipment (UE) in a wireless communication network. The UE includes a wireless transceiver configured for communicating with a base station over at least a bandwidth part (BWP) of a carrier bandwidth, a memory, and a processor communicatively coupled to the wireless transceiver and the memory. The processor and the memory can be configured to receive, from the base station, a slot format indicator within downlink control information or a medium access control (MAC) control element (MAC-CE). The slot format indicator can indicate a slot format of a slot, and the slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The processor and the memory can further be configured to communicate with the base station in the slot based on the slot format via the wireless transceiver.

Another example provides a user equipment (UE) in a wireless communication network. The UE includes means for receiving, from a base station, a slot format indicator within downlink control information or a medium access control (MAC) control element (MAC-CE). The slot format indicator can indicate a slot format of a slot having a carrier bandwidth, and the slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The method further includes means for communicating with the base station in the slot based on the slot format.

Another example provides a non-transitory computer-readable medium having stored therein instructions executable by one or more processors of a user equipment (UE) to receive, from a base station, a slot format indicator within downlink control information or a medium access control (MAC) control element (MAC-CE). The slot format indicator can indicate a slot format of a slot having a carrier bandwidth, and the slot format can include one of a half-duplex slot including at least a bandwidth part (BWP) of the carrier bandwidth configured for uplink transmission or downlink transmission, a sub-band full-duplex slot including at least the BWP configured for simultaneous uplink transmission and downlink transmission, or a flexible slot including at least one flexible symbol configurable as a half-duplex symbol or a sub-band full-duplex symbol. The non-transitory computer-readable medium can further include instructions executable by one or more processors of the UE to communicate with the base station in the slot based on the slot format.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 4A-4C illustrate examples of full-duplex communication in unpaired spectrum according to some aspects.

DETAILED DESCRIPTION

Figure 1:
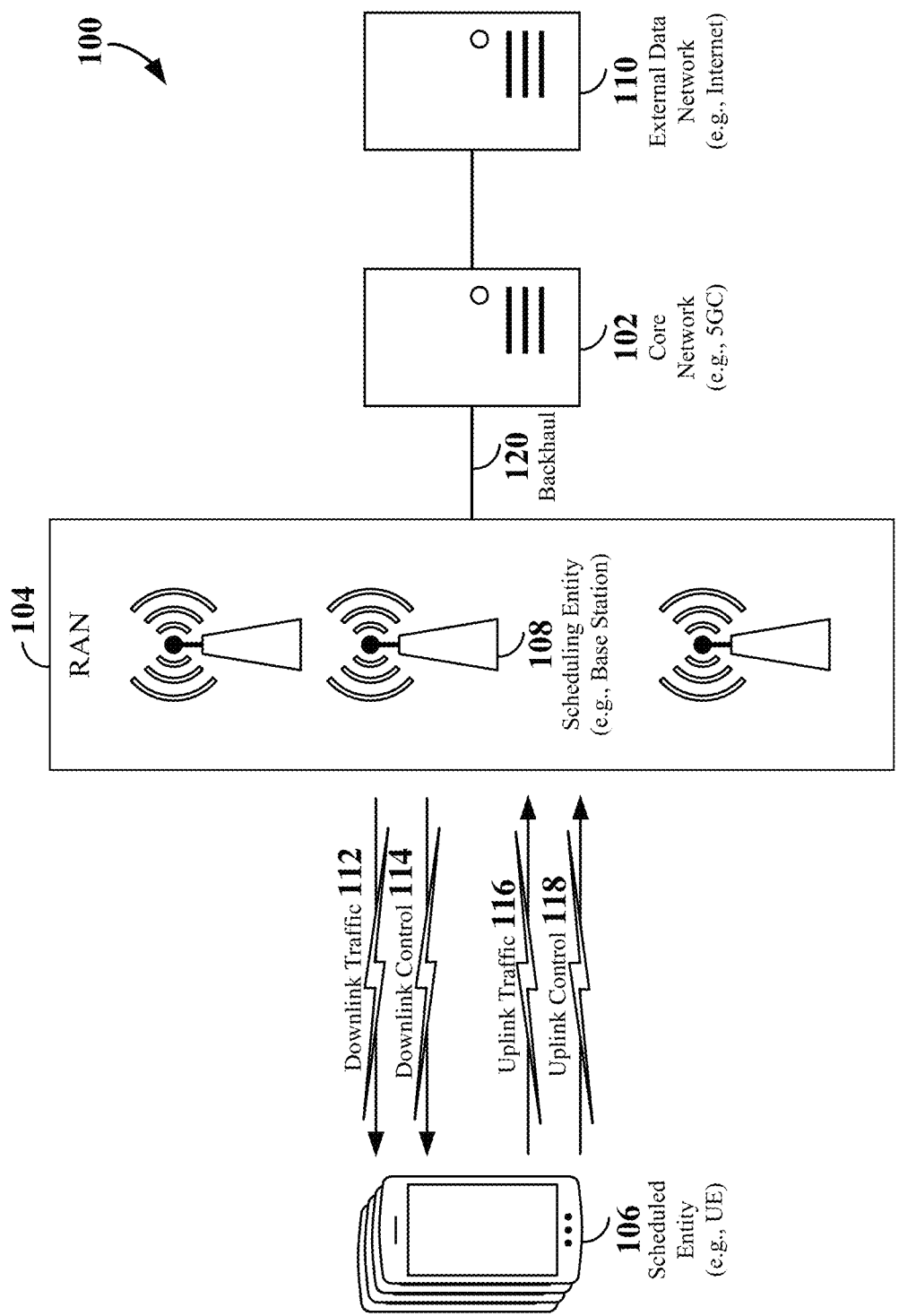
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
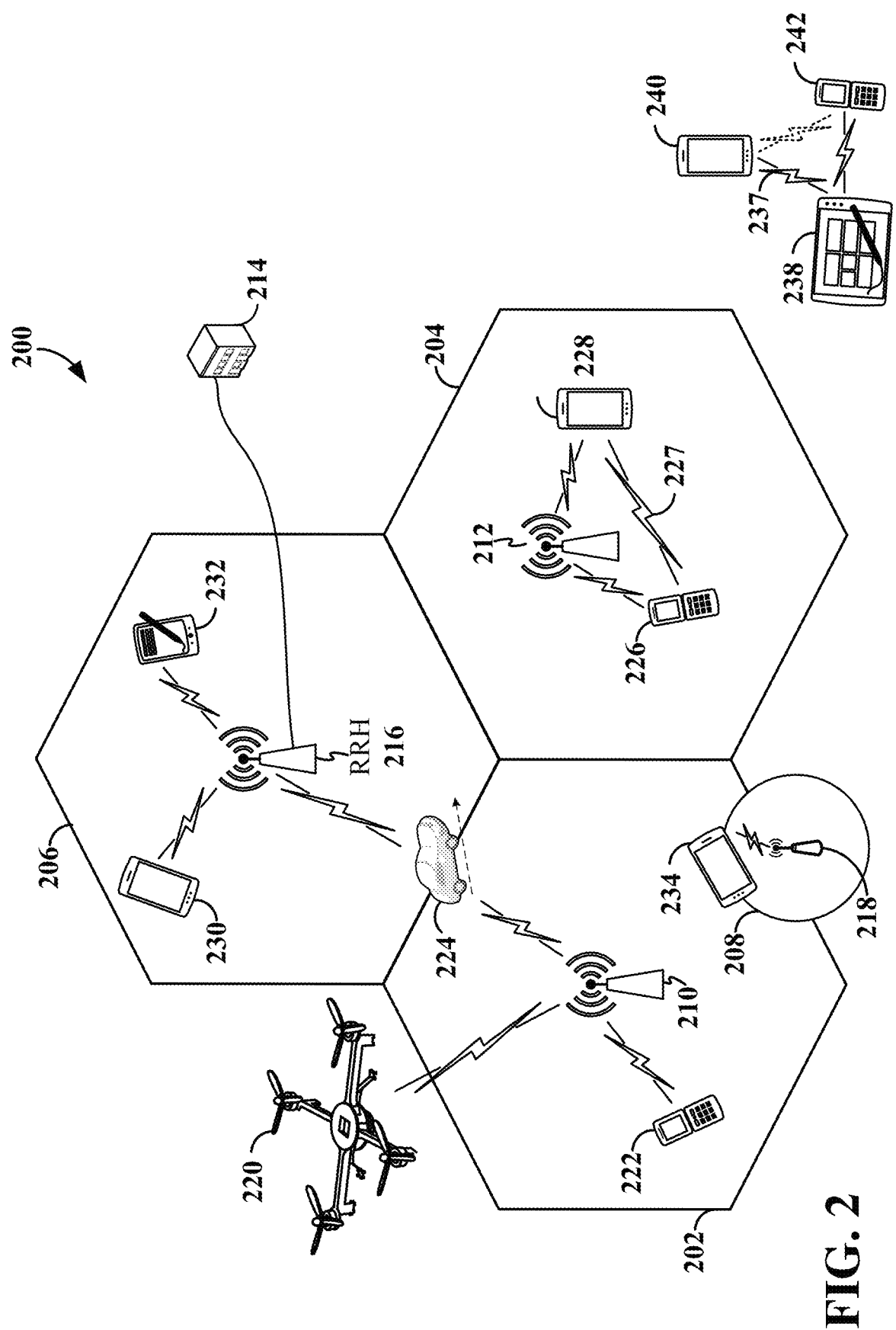
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
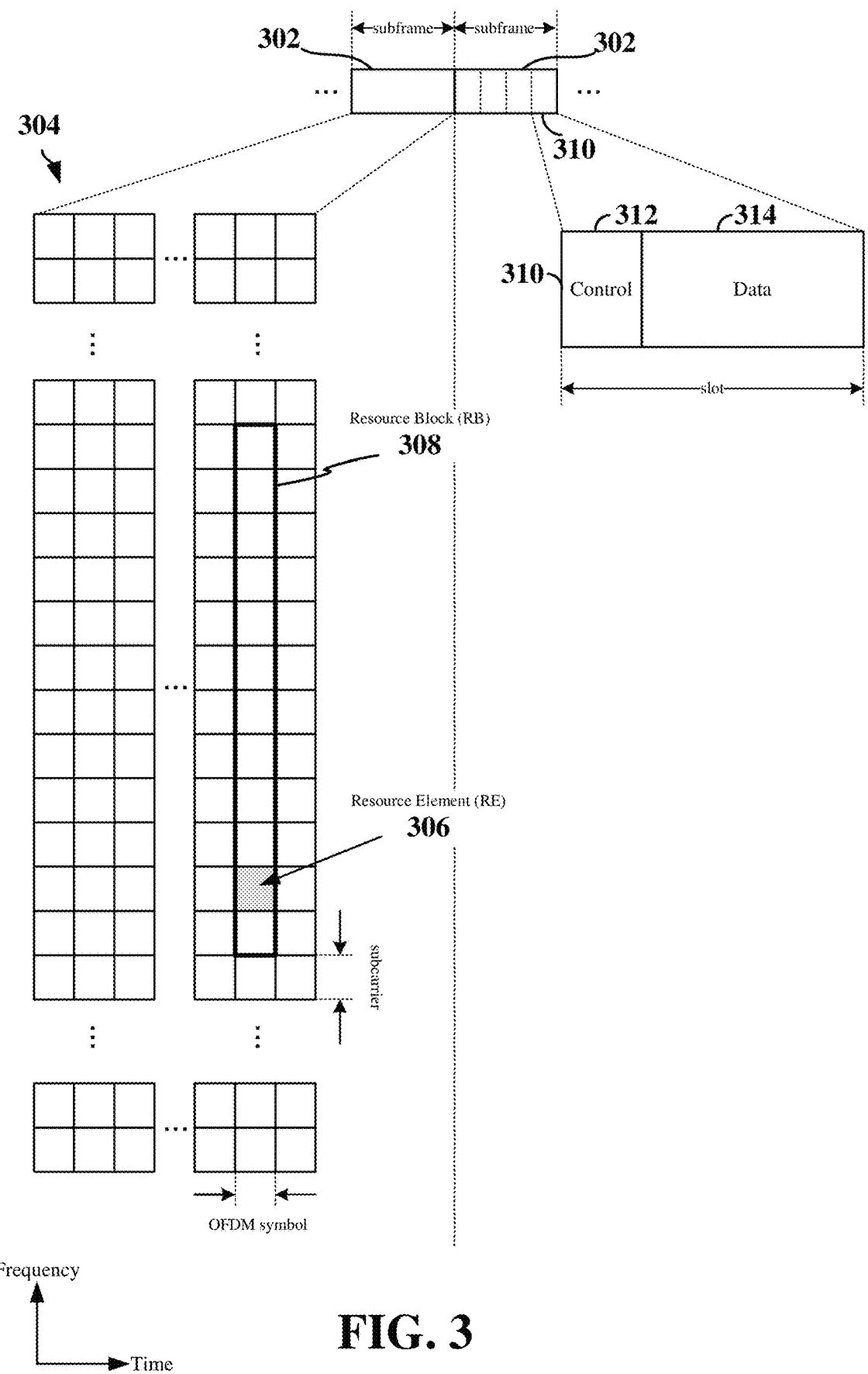
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

A transport block may be communicated between a scheduling entity (e.g., base station, such as a gNB) and a scheduled entity (e.g., a UE) over downlink resources or uplink resources allocated in a slot for the transport block. When operating in a full-duplex mode, both downlink and uplink resources may be allocated within symbols of the same slot for the transmission of both a downlink transport block and an uplink transport block, respectively. In some examples, the downlink and uplink resources may overlap in time (e.g., one or more symbols of the slot may carry both the downlink transport block and the uplink transport block). For example, simultaneous transmissions in different directions (uplink and downlink) may utilize frequency division duplex (FDD) in paired spectrum (e.g., the transmissions in different directions are carried on different carrier frequencies) or in unpaired spectrum (e.g., the transmissions in different directions are carried on a single carrier bandwidth).

FIGS. 4A-4C illustrate examples of full-duplex communication in unpaired spectrum. In the examples shown in FIGS. 4A-4C, time is in the horizontal direction and frequency is in the vertical direction. Here, a carrier bandwidth 402 (or set of one or more active bandwidth parts (BWPs)) is illustrated along the frequency axis and a slot 404 is illustrated along the time axis.

FIGS. 4A and 4B illustrate in-band full-duplex (IBFD) communication, while FIG. 4C illustrates sub-band FDD communication. For IBFD communication, as shown in FIGS. 4A and 4B, downlink and uplink transmissions occur on the same time and frequency resources. For example, downlink resources 406 allocated for transmissions in the downlink direction overlap in both time and frequency with uplink resources 408 allocated for transmissions in the uplink direction. The overlap may be full (as shown in FIG. 4A) or partial (as shown in FIG. 4B).

For sub-band FDD communication, as shown in FIG. 4C, the carrier bandwidth 402 (or active BWPs) may be divided into sub-bands 410a and 410b. Each sub-band 410a and 410b may be allocated for communication in a single direction. For example, sub-band 410a may be allocated for downlink transmissions, while sub-band 410b may be allocated for uplink transmissions. Thus, downlink resources 406 allocated for transmissions in the downlink direction overlap in time, but not in frequency, with uplink resources 408 allocated for transmissions in the uplink direction. The downlink resources 406 may further be separated from the uplink resources 408 in the frequency domain by a guard band 412 to isolate the uplink and downlink transmissions in frequency.

Figure 5A:
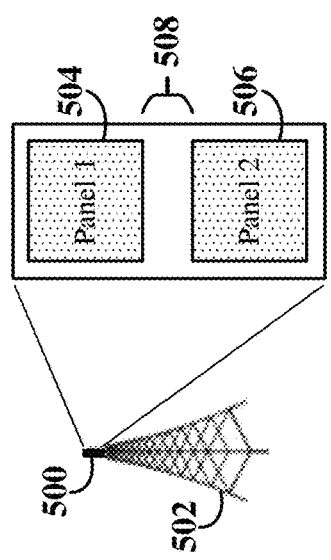
FIG. 5A is a schematic diagram of a base station (e.g., gNB) including an antenna array configured for full-duplex communication according to some aspects.

FIG. 5A is a schematic diagram of a base station 502 (e.g., gNB) including an antenna array 500 configured for full-duplex communication according to some aspects. The antenna array 500 is divided into two panels (panel 1 504, panel 2 506) with a physical separation 508 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. The multi-panel antenna configuration shown in FIG. 5A may also be applicable to UEs to enable full-duplex communication at the UE.

Figure 5B:
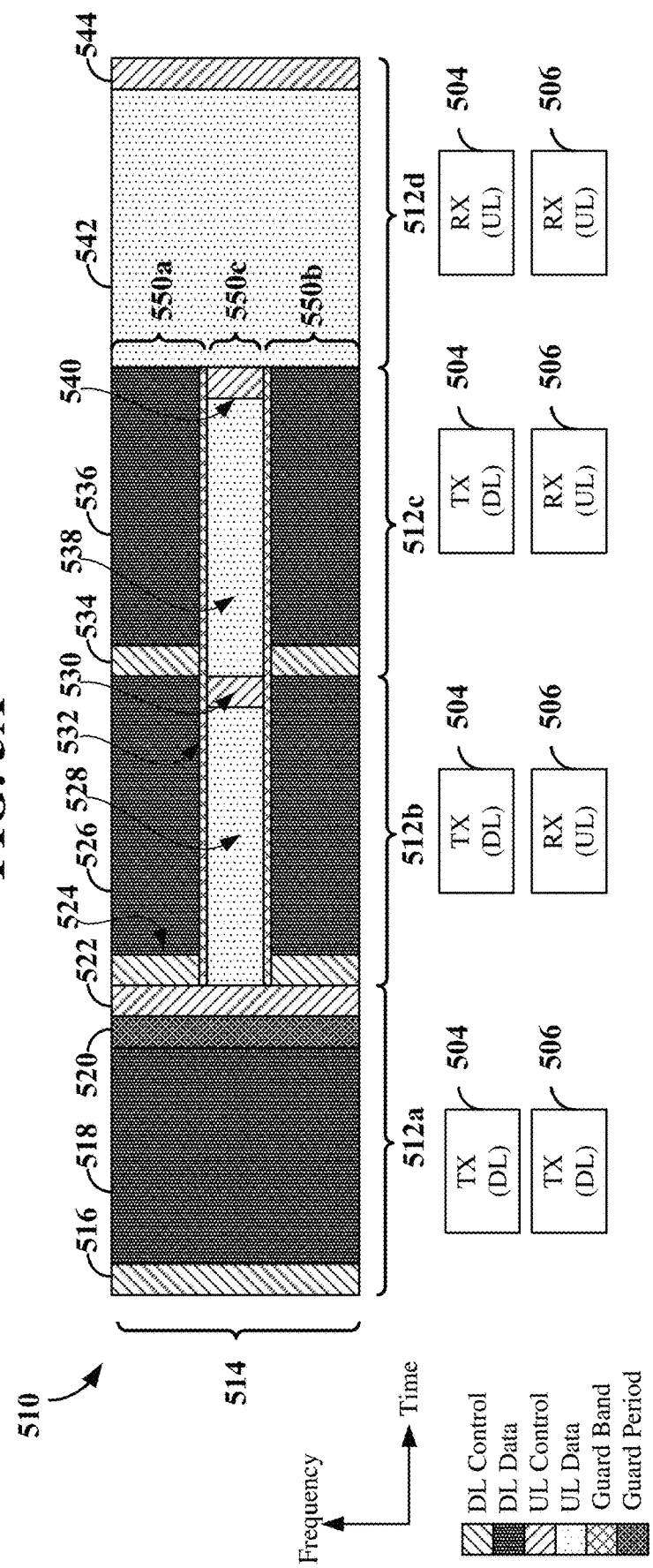
FIG. 5B is a schematic illustration of an example of full-duplex wireless communication using the multi-panel antenna array shown in FIG. 5A according to some aspects.

FIG. 5B is schematic illustration of an example of sub-band full-duplex wireless communication 510 using the multi-panel antenna array 500 shown in FIG. 5A according to some aspects. In the example shown in FIG. 5B, time is in the horizontal direction with units of slots 512a-512d, each including a plurality of OFDM symbols; and frequency is in the vertical direction. Here, a carrier bandwidth 514 (or set of one or more active BWPs) is illustrated along the frequency axis. The carrier bandwidth 514 (or active BWPs) may be divided into a number of sub-bands 550a-550c for sub-band FDD full-duplex operation.

In the example shown in FIG. 5B, in slot 512a, the antenna array 500 is first configured for downlink (DL) communication (e.g., DL burst 516 and DL data portion 518). The DL burst 516 may include DL control transmitted within the first few symbols of the slot 512a. The DL control 516 may include, for example, a physical downlink control channel (PDCCH) carrying DCI that may be related to the slot 512a or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 512a or a subsequent slot (e.g., slot 512b, 512c, and/or 512d), and other suitable information. The DL burst 516 may further include various DL reference signals (e.g., SSB and/or CSI-RS). In this example, both panel 1 504 and panel 2 506 may be configured for DL transmission. The DL data portion 518 may include DL data carried within, for example, a PDSCH. In addition to the DL data, the DL data portion 518 may further include DL reference signals (e.g., DMRS) for use in demodulating and decoding the DL data.

Slot 512a may also include a common uplink (UL) burst 522 at the end of slot 512a. The common UL burst 522 may include, for example, a PUCCH carrying UCI and other UL signals. As illustrated in FIG. 5B, the end of the DL data portion 518 may be separated in time from the beginning of the UL burst 522. This time separation 520 may sometimes be referred to as a gap, a guard period, a guard interval, and/or various other suitable terms. This separation may provide time for the base station and UE to perform a switch-over between transmitting and receiving, or vice-versa. In this example, both panel 1 504 and panel 2 506 may be configured for UL transmission during the UL burst 522.

In slots 512b and 512c, the antenna array 500 is configured for both DL communication and UL communication. For example, in slots 512b and 512c, the carrier bandwidth 514 (or active BWPs) is shown partitioned between uplink transmissions and downlink transmissions. Sub-bands 550a and 550b are allocated for downlink transmissions, while sub-band 550c is allocated for uplink transmissions. In an example operation of the sub-band full-duplex configuration shown in FIG. 5, panel 1 504 may be configured for DL transmission at both edges (e.g., sub-bands 550a and 550b) of the carrier bandwidth 514 (or active BWPs) and panel 2 506 may be configured for UL reception in the middle (e.g., sub-band 550c) of the carrier bandwidth 514 (or active BWPs).

In each of the sub-band FDD slots 512b and 512c, the DL sub-bands 550a and 550b include a DL burst 524 and 534, respectively, which may include a PDCCH carrying DCI and/or DL reference signals, in the initial portion of the slots 512b and 512c. Following the DL bursts 524 and 534, slots 512b and 512c each include a DL data portion 526 and 536, respectively, for transmitting DL data within sub-bands 550a and 550b. For example, the DL data may be transmitted within a PDSCH. In addition to the DL data, the DL data portions 526 and 536 may further include DL reference signals (e.g., DMRS) for use in demodulating and decoding the DL data.

In the uplink (UL) sub-band 550c, the slots 512b and 512c each include an UL data portion 528 and 538, respectively, for transmitting UL data. For example, the UL data may be transmitted within a PUSCH. Following the UL data portions 528 and 538, the UL sub-band 550c of slots 512b and 512c each include an UL burst 530 and 540, respectively. The UL burst 530 and 540 may include, for example, a PUCCH including UCI and/or other UL signals. Guard bands 532 are further provided between the UL sub-band 550c and the DL sub-bands 550a and 550b to mitigate self-interference between simultaneous DL transmissions in the DL sub-bands 550a and 550b and UL transmissions in the UL sub-band 550c.

Slots 512b and 512c are sub-band full-duplex FDD slots utilizing FDM for multiplexing uplink and downlink transmissions in frequency. The sub-band full-duplex slot configurations shown in FIG. 5 are merely exemplary, and other configurations of sub-band full-duplex slots may be utilized in various aspects of the disclosure. For example, sub-band full-duplex slots including other configurations of UL and DL sub-bands (e.g., the configuration shown in FIG. 4C or other suitable sub-band configurations) may be employed in various aspects.

In slot 512d, the antenna array 500 is configured for UL communication. For example, slot 512d includes an UL data portion 542 followed by an UL burst 544. The UL data portion 542 and UL burst 544 may include UL control information and/or UL data, as discussed above. In this example, both panel 1 504 and panel 2 506 may be configured for UL reception. Slots 512a and 512d are half-duplex TDD slots utilizing TDM for multiplexing DL transmissions and UL transmissions in time.

In some aspects of the disclosure, one or more slots may be flexible slots including one or more flexible symbols that may be configured as either half-duplex symbols (e.g., all UL or all DL) or sub-band full-duplex symbols (e.g., including both UL and DL transmissions). For example, in slot 512b, the DL burst 524 may be configured to occupy all sub-bands 550a-550c of the slot 512b, and as such, the symbols corresponding to the DL burst 524 may be flexible symbols that may be configured as half-duplex symbols to enable DL communication across all sub-bands 550a-550c. Similarly, the UL burst 530 may be configured to occupy all sub-bands 550a-550c of the slot 512b, and as such, the symbols corresponding to the UL burst 530 may be flexible symbols that may be configured as half-duplex symbols to enable UL communication across all sub-bands 550a-550c.

In sub-band full-duplex operation, the slot formats can be classified according to the duplex mode of the base station. For example, the slot may be classified as a half-duplex slot (e.g., slot 512a or 512b) including symbols dedicated to either DL transmission or UL transmission based on TDM. In addition, the slot may be classified as a full-duplex (or sub-band full-duplex) slot (e.g., slot 512b or 512c) including a hybrid of DL and UL transmissions based on FDM. The slot may further be classified as a flexible slot that may be partially or fully configurable (e.g., one or more symbols may be flexible symbols).

In various aspects of the disclosure, to accommodate low latency and/or high reliability traffic, such as ultra-reliable low-latency communication (URLLC), a base station operating in sub-band full-duplex mode may dynamically change the slot format of a slot between half-duplex and sub-band full-duplex and/or may change flexible symbols within a flexible slot between half-duplex and sub-band full-duplex. A slot format indicator (SFI) indicating the slot format of the slot may be signaled, for example, via DCI mapped to a PDCCH or medium access control (MAC) control element (MAC-CE) mapped to a PDSCH.

Figure 6:
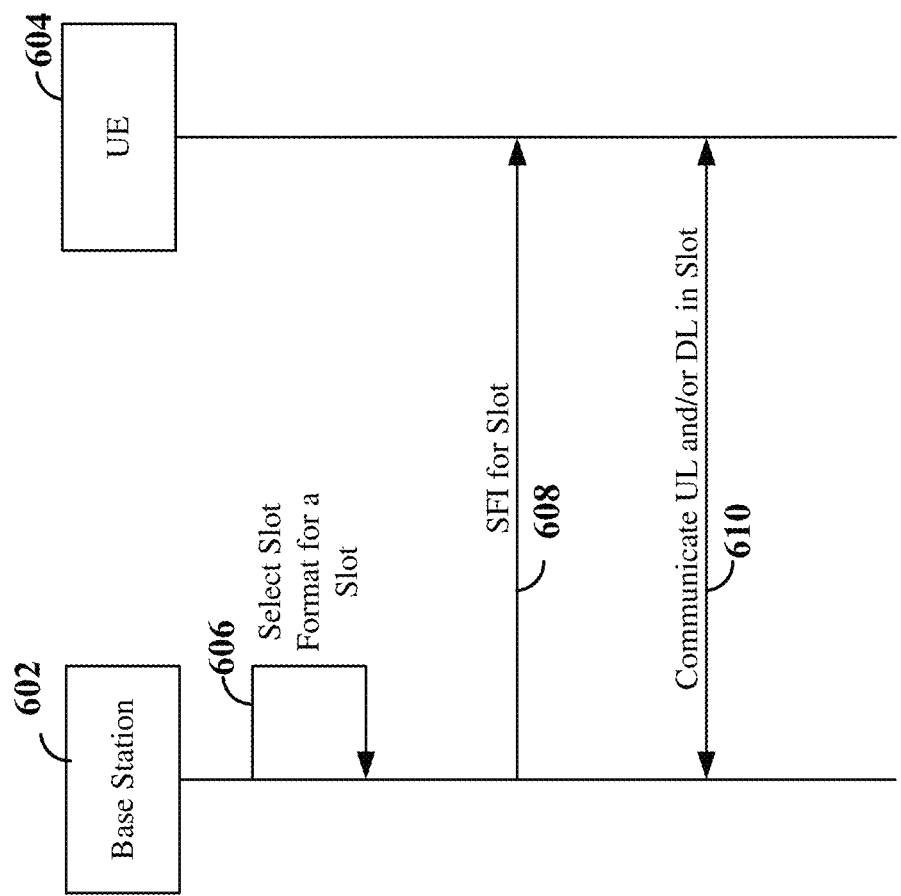
FIG. 6 is a signaling diagram illustrating an example of slot format indication for sub-band full-duplex operation according to some aspects.

FIG. 6 is a signaling diagram illustrating an example of slot format indication for sub-band full-duplex operation according to some aspects. In the example shown in FIG. 6, a base station 602 (e.g., a gNB) is in wireless communication with a UE 604. The base station 602 may correspond to any of the scheduling entities or base stations shown in FIGS. 1, 2, and/or 5A that may be configured to operate in the sub-band full-duplex mode. The UE 604 may correspond to any of the scheduled entities or UEs shown in FIGS. 1 and/or 2.

At 606, the base station 602 may select a slot format for a slot. The slot may include a carrier bandwidth and communications with the UE 604 in the slot may occur across the carrier bandwidth or within one or more active bandwidth parts (BWPs) of the carrier bandwidth. The slot format may include, for example, one of a half-duplex slot in which at least a BWP of the slot is configured for either uplink transmission or downlink transmission, a sub-band full-duplex slot in which at least the BWP is configured for simultaneous uplink transmission and downlink transmission, or a flexible slot including at least one flexible symbol configurable as a half-duplex symbol or a sub-band full-duplex symbol.

At 608, the base station 602 may transmit a slot format indicator (SFI) indicating the slot format to the UE 604. In examples in which the selected slot format includes a flexible slot, the SFI may further indicate the particular configuration of the flexible symbols within the slot. The SFI may be included, for example, within DCI carried in a PDCCH or within a MAC-CE carried in a PDSCH. For example, the DCI may have DCI format 2_0, which is configured to carry group common control information (e.g., control information broadcast to a group of UEs) including an SFI information element (IE). The DCI may further include a set of cyclic redundancy check (CRC) bits that are scrambled with a radio network temporary identifier (RNTI), which may be an SFI specific RNTI, to allow the UE 604 to determine the type of control information (e.g., SFI) sent in the PDCCH.

At block 610, the base station 602 and UE 604 may communicate uplink and/or downlink transmissions within the slot based on the SFI. For example, if the SFI indicates that the slot is a DL half-duplex slot, the base station 602 may be configured to transmit DL control and/or DL data to the UE 604 in the slot. In some examples, the DL half-duplex slot may include an UL burst at the end of the slot, as shown in FIG. 5B. As another example, if the SFI indicates that the slot is an UL half-duplex slot, the UE 604 may be configured to transmit UL data and/or UL control to the base station 602 in the slot. As yet another example, if the SFI indicates that the slot is a sub-band full-duplex slot, the base station 602 may be configured to transmit DL control and/or DL data to the UE 604 within one or more DL sub-bands of the slot and the UE 604 may be configured to transmit UL control and/or UL data to the base station 602 within one or more UL sub-bands of the slot. In some examples, the SFI may further indicate the configuration of one or more symbols of a flexible slot. For example, the SFI may indicate that a first set of one or more symbols in the slot are half-duplex symbols (carrying DL or UL communication) and a second set of one or more symbols in the slot are sub-band full-duplex symbols (carrying both DL and UL communication in different sub-bands).

To avoid or mitigate cross-link interference (CLI) that may be incurred by an SFI miss or false detection involving one or more UEs, various aspects of the disclosure further provide mechanisms for boosting SFI transmissions. For example, when the SFI changes a set of resources (e.g., one or more sub-bands and/or symbols) in a slot from UL resources to DL resources, if a UE having a semi-persistently or periodically scheduled UL transmission in the set of resources misses the SFI, CLI may occur between the UL transmission by the UE and any DL transmission by the base station.

In examples in which the SFI is carried in a PDCCH, the PDCCH may be transmitted over an aggregation of contiguous control channel elements (CCEs) in the DL control portion of the slot. To improve the reliability of an SFI transmission, a larger aggregation level may be applied to a PDCCH carrying the SFI.

Figure 7:
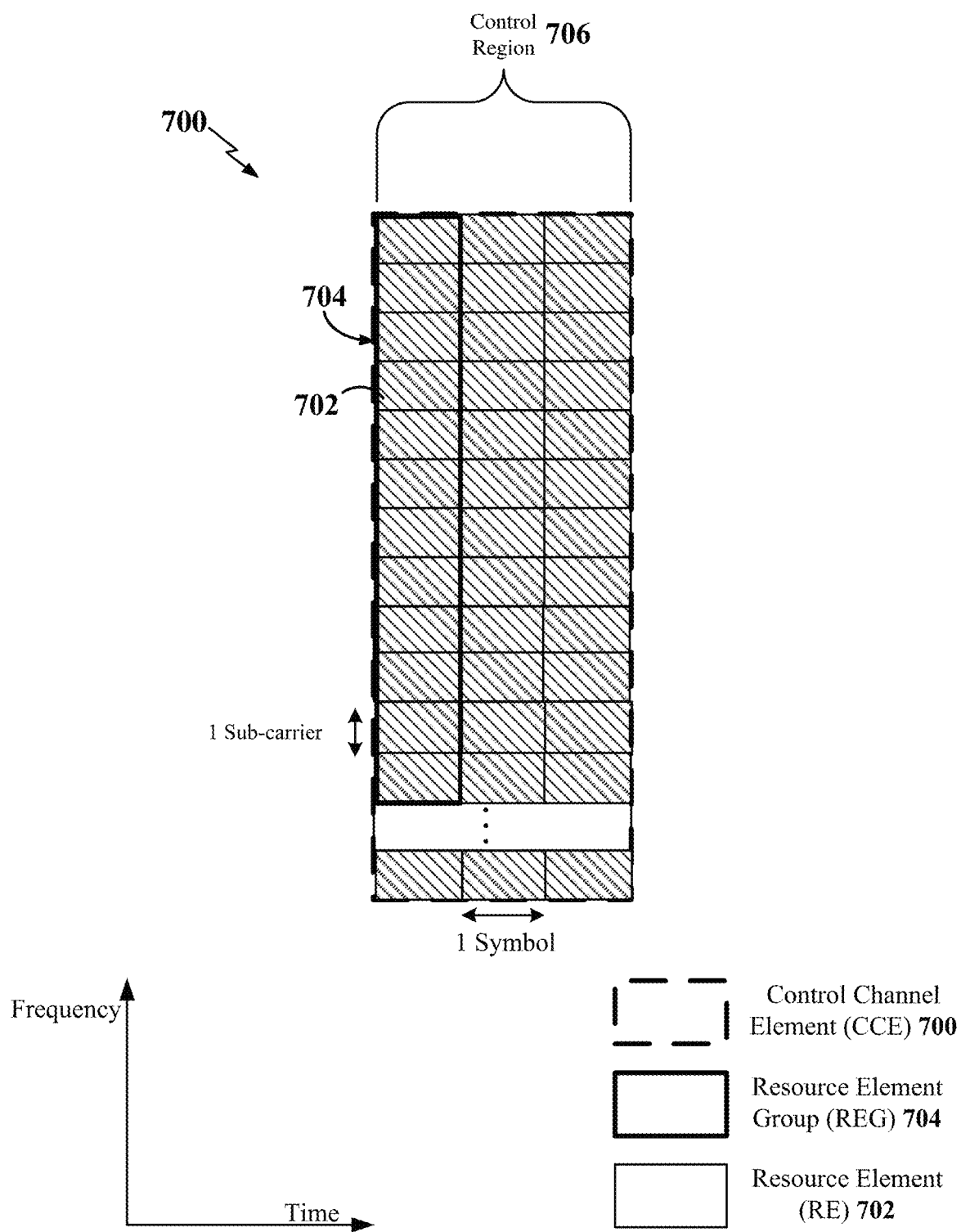
FIG. 7 is a schematic illustration of an example CCE structure in a DL control portion of a slot according to some aspects.

FIG. 7 is a schematic illustration of an example CCE 700 structure in a DL control portion 706 of a slot according to some aspects. The slot may correspond, for example, to any of the slots illustrated in FIG. 5B. The CCE 700 structure of FIG. 7 represents a portion of the DL control portion 706, including a number of REs 702 that may be grouped into resource element groups (REGs) 704. Each REG 704 generally may contain, for example, twelve consecutive REs 702 (or nine REs 702 and three DMRS REs) within the same OFDM symbol and the same RB. In this example, the CCE structure 700 includes at least six REGs 704 distributed across three OFDM symbols. However, as those skilled in the art will readily appreciate, the CCE 700 structure for any particular application may vary from the example described herein, depending on any number of factors. For example, the CCE 700 structure may contain any suitable number of REGs.

In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, 8, and 16 may be supported, corresponding to 1, 2, 4, 8, or 16 contiguous CCEs, respectively.

In various aspects of the disclosure, the base station may apply an aggregation level to a PDCCH carrying the SFI that is greater than or equal to a threshold aggregation level to improve the reliability of the SFI transmission. For example, the aggregation level for SFI may be lower bounded by the threshold aggregation level $N_{f,r,w}$, where f refers to the carrier frequency, r refers to the coverage of a cell served by the base station (e.g., a micro-cell, small cell, or large cell), and w refers to the bandwidth of the active DL BWP. In this example, the threshold aggregation level may be set based on at least one of f, r, and w. In an example of a large cell (large r), the base station may set a higher threshold aggregation level (e.g., N=4 or 8) for a PDCCH carrying SFI to ensure the PDCCH is received by cell-edge UEs. In an example of a small cell or when the base station is targeting or prioritizing the SFI towards UEs near the base station (small r), the base station may set a lower threshold aggregation level (e.g., N=2 or 4) for a PDCCH carrying SFI. In some examples, the threshold aggregation level N may be defined in a standard (e.g., 3GPP NR standard) and hard-coded in the base station and the UE. In other examples, the threshold aggregation level N may be provided to the UE via, for example, radio resource control (RRC) signaling.

Since the UE is unaware of the particular aggregation level of the PDCCH or whether multiple PDCCHs may exist for the UE in the slot, the UE may perform blind decoding of various decoding candidates within the first N control OFDM symbols (as indicated by the slot format of the slot). Each decoding candidate includes a collection of one or more consecutive CCEs based on an assumed DCI length (e.g., PDCCH aggregation level). To limit the number of blind decodes, search space sets defining UE-specific search spaces and common search spaces may be defined. The search space sets limit the number of blind decodes that the UE performs for each PDCCH format combination. The common search space sets consist of CCEs used for sending control information that is common to a group of UEs or to all UEs. Thus, the common search space sets are monitored by multiple UEs in a cell.

The starting point (offset or index) of a search space set for group common control information may be the same for all UEs in the group and there may be multiple search space sets defined for group common control information (e.g., one for each configured aggregation level for the group of UEs). Based on the threshold aggregation level N, the UE may monitor a plurality of search space sets (in frequency) within at least one monitoring occasion (in time) for a PDCCH carrying SFI, where each search space set corresponds to an aggregation level that is greater than or equal to the threshold aggregation level N for the SFI PDCCH. The UE may perform blind decoding over all group common control search space sets to determine whether at least one valid DCI carrying SFI exists in the search space sets.

The reliability of the SFI may further be improved by transmitting repetitions of the SFI. For example, the base station may configure multiple, concatenated control resource sets (CORESETs) for SFI repetition. Each CORESET may include one or more CCEs based on the aggregation level applied to the PDCCH carrying the SFI. The UE may monitor a plurality of search space sets within at least one monitoring occasion for the concatenated CORESETs including the repetitions of the SFI and combine the repetitions of the SFI to produce a combined SFI. Here, each CORESET may include a respective repetition of the SFI.

Figure 8:
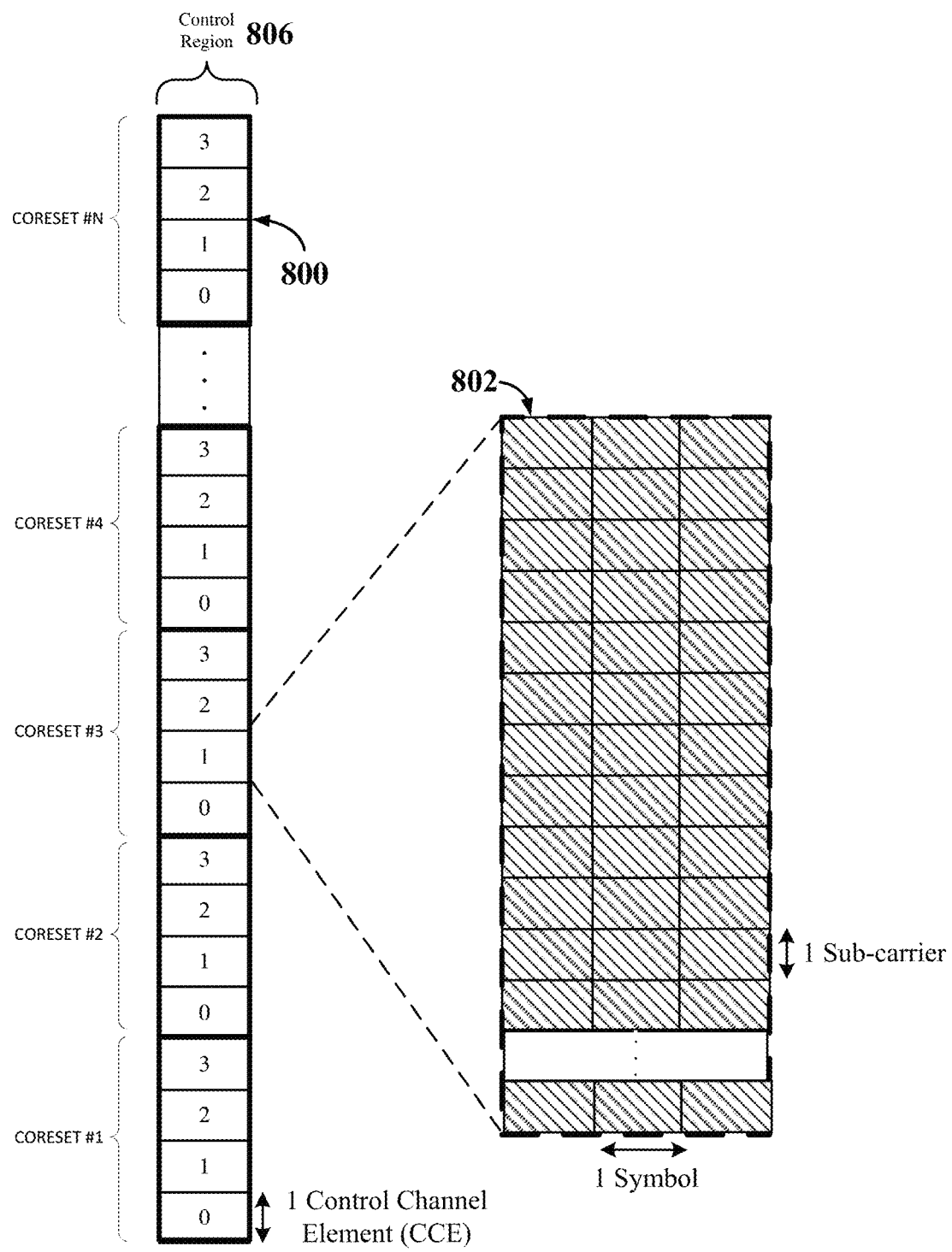
FIG. 8 is a schematic illustration of a number of example control-resource sets (CORESETs) of a DL control portion of a slot according to some aspects.

FIG. 8 is a schematic illustration of a number of example control-resource sets (CORESETs) 800 of a DL control portion 806 of a slot according to some aspects. The DL control portion 806 may correspond, for example, to the DL control portion illustrated in FIG. 3 or 5B. A CORESET 800 may be configured for group common control information or UE-specific control information and may be used for transmission of a PDCCH including the group common control information or UE-specific control information to a set of one or more UEs. The UE may monitor one or more CORESETs 800 that the UE is configured to monitor for the UE-specific or group common control information.

Each CORESET 800 represents a portion of the DL control portion 806 including a number of sub-carriers in the frequency domain and one or more symbols in the time domain. In the example of FIG. 8, each CORESET 800 includes at least one CCE 802 having dimensions in both frequency and time, sized to span across at three OFDM symbols. A CORESET having a size that spans across two or more OFDM symbols may be beneficial for use over a relatively small system bandwidth (e.g., 5 MHz). However, a one-symbol CORESET may also be possible.

A first CORESET 800 is indexed as "CORESET #1" (control resource set (CORESET) index) and is shown as occurring during three OFDM symbols in the time domain and occupying a first region of frequency resources in the frequency domain of the DL control portion 806. In the example shown in FIG. 8, the first CORESET 800 may include four CCEs 802. It should be noted that this is just one example. In another example, the first CORESET 800 may include any suitable number of CCEs 802.

The base station may allocate a plurality of concatenated CORESETs 800 (e.g., CORESET #1-CORESET #N) to transmit repetitions of the same PDCCH, each carrying a same SFI. The concatenated CORESETs 800 occupy consecutive time-frequency resources within the DL control portion 806 of the slot. In the example shown in FIG. 8, each concatenated CORESET 800 includes four CCEs 802, each including six REGs distributed across three symbols. The number of CCEs 802 and configuration of CCEs 802 for each CORESET 800 may be dependent, for example, on the aggregation level applied to the PDCCH carrying the SFI.

A concatenation pattern of the plurality of concatenated CORESETs may be pre-configured on the UE. For example, the base station may transmit the concatenation pattern to the UE via RRC signaling. The concatenation pattern may indicate, for example, the number of CORESETs (e.g., the number of SFI repetitions) and other suitable information related to the CORESET pattern. The monitoring occasion(s) for SFI repetition may further be pre-configured on the UE. For example, the base station may transmit a configuration of monitoring occasion(s) associated with reception by the UEs of the repetitions of the SFI via, for example, RRC signaling. Each UE may monitor multiple search space sets for the plurality of concatenated CORESETs within the monitoring occasion(s) for the SFI repetitions and combine the repeated SFIs to produce a combined SFI with improved reliability.

In some examples, each of the SFI repetitions may be beam-formed. In this example, the repetitions of the SFI may be transmitted across a plurality of beams. In some examples, the repetitions of the SFI may be transmitted in MAC-CEs across the plurality of beams. In other examples, the repetitions of the SFI may be transmitted in DCI across the plurality of beams. In this example, each CORESET within the plurality of concatenated CORESETs may be associated with a respective beam. For example, a respective transmission configuration indicator (TCI) state may be associated with each CORESET to indicate the respective beam for each CORESET on which the SFI repetition is transmitted. In this example, the concatenation pattern may further indicate the set of beams (e.g., TCI states) corresponding to the respective CORESETs.

Beamforming is a signal processing technique that may be used at the transmitter or receiver to shape or steer an antenna beam (e.g., a transmit beam or receive beam) along a spatial path between the transmitter and the receiver. Beamforming may be achieved by combining the signals communicated via antennas (e.g., antenna elements of an antenna array, such as the antenna array shown in FIG. 5A) such that some of the signals experience constructive interference while others experience destructive interference. To create the desired constructive/destructive interference, the transmitter or receiver may apply amplitude and/or phase offsets to signals transmitted or received from one or more of the antenna elements associated with the transmitter or receiver.

Figure 9:
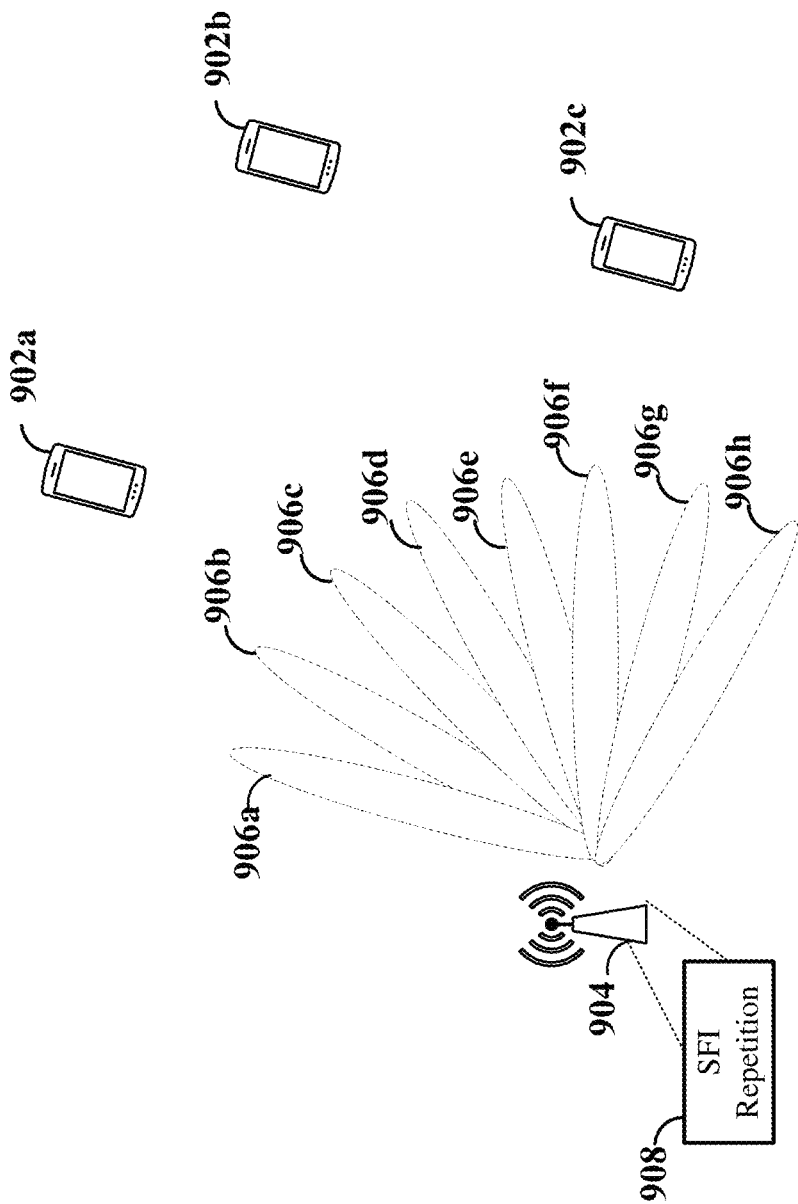
FIG. 9 is a diagram illustrating communication between a base station and a plurality of UEs using downlink beamformed signals according to some aspects.

FIG. 9 is a diagram illustrating communication between a base station 904 and a plurality of UEs 902a-902c using downlink beamformed signals according to some aspects. The base station 904 may correspond to any of the base stations or other scheduling entities illustrated in FIGS. 1, 2, 5A, and/or 6, and the UEs 902a-902c may correspond to any of the UEs or other scheduled entities illustrated in FIGS. 1, 2, and/or 6. It should be noted that while some beams are illustrated as adjacent to one another, such an arrangement may be different in different aspects. In some examples, beams transmitted during a same symbol may not be adjacent to one another. In some examples, the base station 904 may transmit more or less beams distributed in all directions (e.g., 360 degrees).

In the example shown in FIG. 9, the base station 904 may include SFI repetition circuitry 908, configured to identify a set of beams 906a-906h on which to transmit repetitions of the SFI via MAC-CEs or DCI. Each beam may be transmitted in a different respective beam direction. In examples in which the SFI repetitions are transmitted in DCI, each beam may be transmitted on a respective CORESET, and all CORESETs may be concatenated within a DL control portion of a slot. The set of beams 906a-906h may be distributed in all directions or may be located within one or more sectors of a cell served by the base station in order to target SFI repetition towards a set of one or more UEs (e.g., UEs 902a-902c), the latter being illustrated. At each UE 902a-902c, the SFI repetitions received on the plurality of beams 906a-906h may be spatially combined to produce a combined SFI, thereby improving the spatial diversity gain of SFI reception and increasing the reliability of the SFI.

In various aspects, the reliability of the SFI may further be improved by enhancing the CRC appended to the DCI containing the SFI, enhancing the modulation and coding scheme (MCS) utilized for the PDCCH carrying the SFI, and/or increasing the transmit power of the PDCCH carrying the SFI. In some examples, the base station may increase the number of CRC bits appended to the DCI. For example, the base station may generate a PDCCH carrying the SFI with a number of CRC bits greater than a threshold number of CRC bits. For example, the threshold number of CRC bits may be twenty-four bits. The base station may, for example, increase the number of CRC bits to thirty or thirty-six CRC bits. In other examples, the base station may segment a payload of the PDCCH carrying the SFI into two or more segments. A respective set of segment CRC bits may be generated for each segment. In addition, a set of global CRC bits may be generated for the PDCCH including the respective sets of segment CRC bits.

Figure 10:
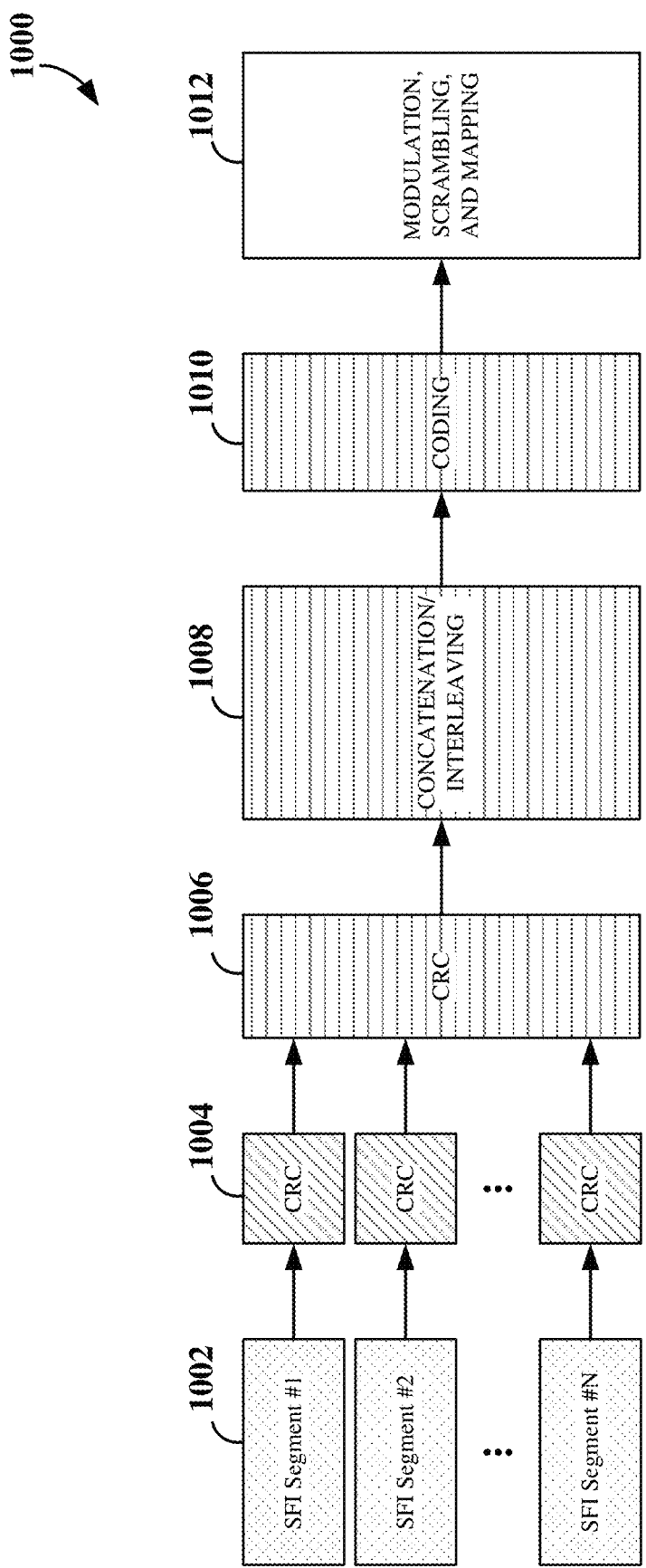
FIG. 10 is a schematic illustration of circuitry within a base station configured to generate a PDCCH carrying SFI according to some aspects of the disclosure.

FIG. 10 is a schematic illustration of circuitry 1000 within a base station configured to generate a PDCCH carrying SFI according to some aspects of the disclosure. In this illustration, the base station may segment the payload of a PDCCH carrying SFI into multiple SFI segments 1002 (SFI Segment #1, SFI Segment #2, . . . , SFI Segment #N). In some examples, the PDCCH payload may be divided equally, such that the size of each SFI segment 1002 may be the same.

As illustrated, each SFI segment 1002 is subjected to a segment CRC calculation block 1004, and a corresponding segment CRC (e.g., set of segment CRC bits) may be appended to each SFI segment. In some examples, the segment CRCs may each include one or more CRC bits. For example, each segment CRC may have a length of sixteen, twenty-four, or thirty-two bits. The SFI segments 1002, including the appended segment CRCs, may then collectively be subjected to a second, global CRC calculation block 1006 to apply a global CRC (e.g., set of global CRC bits) to the combined SFI segments and corresponding segment CRCs. In some examples, the global CRC may include twenty-four CRC bits.

The combined SFI segments, together with the segment CRCs and global CRC, may then be concatenated or interleaved by a concatenation/interleaving block 1008 (e.g., to create a relatively large information block) that may then be encoded by an encoder 1010 (e.g., a polar encoder) to produce a code block (or plurality of code blocks that may be grouped into code block groups). The code block(s) may then be subjected to a modulation, scrambling, and mapping block 1012 to modulate, scramble, and/or map the code block(s) to suitable resources (e.g., a CORESET) for transmission over a wireless air interface.

In some examples, the segment CRC calculation blocks 1004 may be removed or bypassed, and instead the global CRC calculation block 1006 may be configured to generate a global CRC having a length greater than a CRC threshold (e.g., a threshold number of CRC bits). The CRC threshold may be, for example, twenty-four bits. For example, the global CRC calculation block 1006 may apply an extended CRC (e.g., greater than twenty-four CRC bits) to the PDCCH payload (e.g., the SFI). In some examples, the extended CRC may include thirty or thirty-six bits.

In some examples, in addition to or as an alternative to including segment-wise CRC on top of global CRC or an extended global CRC, the base station may further select an MCS that may decrease sensitivity to channel estimation errors. In current 5G NR specifications, the PDCCH is modulated using quadrature phase shift keying (QPSK). In some examples, the modulation, scrambling, and mapping block 1012 may select binary phase shift keying (BPSK) instead of QPSK for modulating the PDCCH carrying SFI. BPSK relies on amplitude modulation, and therefore, may be more robust than QPSK, which relies on phase modulation.

In some examples, SFI reliability boosting may be accomplished using any combination of the examples described above with reference to FIGS. 7-10. For example, the base station may boost the reliability of the SFI by performing one or more of: (1) applying an aggregation level greater than or equal to a threshold aggregation level to a PDCCH carrying SFI; (2) transmitting repetitions of the SFI across a plurality of beams via DCI or MAC-CEs; (3) increasing the number of CRC bits (e.g., using an extended CRC) or adding segment-wise CRC on top of global CRC; (4) modulating the PDCCH utilizing BPSK; and/or (5) transmitting the SFI at a transmit power above a threshold transmit power.

In some examples, the SFI may change a set of resources (e.g., one or more sub-bands and/or symbols) in the slot from UL resources to DL resources. When a UE that is pre-configured for UL transmission (e.g., a periodic or semi-persistently scheduled SRS, PUSCH, or PUCCH) in the set of resources misses the SFI, the UL transmission by the UE may interfere with DL reception by other UEs that successfully detected the SFI.

To further avoid or mitigate the CLI incurred by the missed SFI, the base station may prioritize transmission of the SFI towards a group of UEs that have semi-persistently or periodically scheduled UL transmissions within the set of resources. In some examples, the base station may prioritize transmission of the SFI towards those UEs that may be strong interferers (e.g., the UEs having transmit beams more likely to interfere with the intended DL pre-emption resulting from the SFI).

Figure 11:
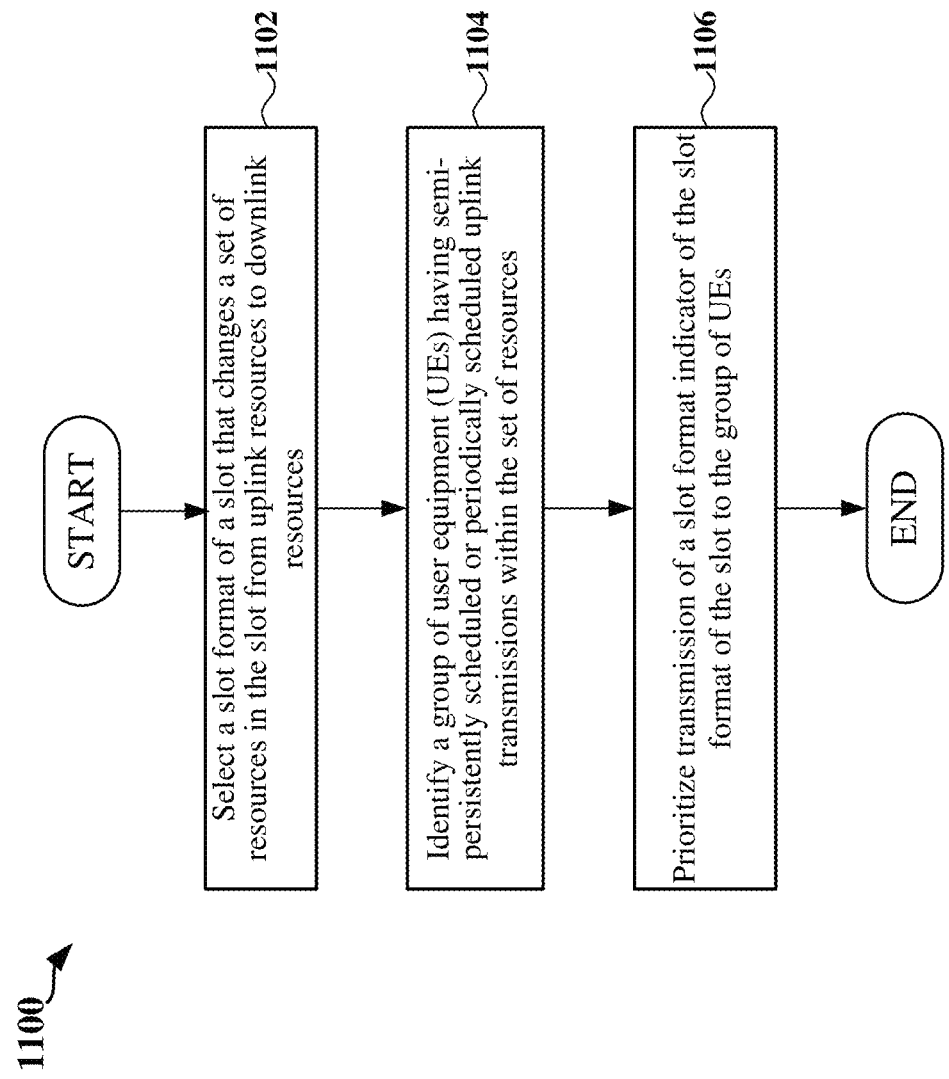
FIG. 11 is a flow chart of an exemplary method for SFI prioritization according to some aspects.

FIG. 11 is a flow chart 1100 of an exemplary method for SFI prioritization according to some aspects. As described below, some or all illustrated features may be omitted in a particular implementation within the scope of the present disclosure, and some illustrated features may not be required for implementation of all embodiments. In some examples, the method may be performed by the base station 1300, as described below and illustrated in FIG. 13, by a processor or processing system, or by any suitable means for carrying out the described functions.

At block 1102, the base station may select a slot format of a slot that changes a set of resources in the slot from uplink resources to downlink resources. For example, the slot may have previously been configured as an UL half-duplex slot and the selected slot format may correspond to a DL half-duplex slot. As another example, the slot may have previously been configured as a sub-band full-duplex slot including at least one UL sub-band corresponding to the set of resources, and the selected slot format may correspond to a DL half-duplex slot. As yet another example, the slot may have previously been configured as an UL half-duplex slot and the selected slot format may correspond to a sub-band half-duplex slot including at least one DL sub-band corresponding to the set of resources. Other examples may include re-configuration of one or more symbols in the slot from UL symbols or symbols including an UL sub-band to DL symbols or symbols including a DL sub-band.

At block 1104, the base station may identify a group of UEs having semi-persistently scheduled or periodically scheduled uplink transmissions within the set of resources. At block 1106, the base station may prioritize transmission of the SFI to the group of UEs (e.g., a set of UEs having semi-persistently scheduled or periodically scheduled uplink transmissions in the set of resources or a sub-set of the set of UEs). In some examples, the sub-set of UEs may be strong interferers.

In an example, the base station may prioritize transmission of the SFI to the group of UEs by repeating transmission of the SFI across a plurality of beams (e.g., as described above in connection with FIGS. 8 and 9), where the plurality of beams are selected based on the group of UEs. For example, the base station may select the active DL beams currently utilized for communication with each of the UEs in group of UEs.

In another example, the base station may apply an aggregation level to the PDCCH carrying the SFI that is at least a threshold aggregation level, as described above in connection with FIG. 7, based on at least the group of UEs. For example, the selected aggregation level may be limited by a maximum payload size of the SFI as determined by the CORESET size that the UEs are configured to monitor. In this example, the number of UEs that may receive the group common control information including the SFI may be limited. For example, the number of UEs (e.g., the set of UEs) having semi-persistently scheduled or periodically scheduled UL transmissions within the set of resources may be greater than the number of UEs that may receive the SFI (e.g., as based on the CORESET size limit). In this example, the base station may prioritize transmission of the SFI by selecting a sub-set of the set of UEs having transmit beams more likely to interfere with DL transmissions in the set of resources.

For example, the base station may select a sub-set of UEs from the set of UEs that each have a respective transmit beam configured to produce a higher interference level within the set of resources (e.g., higher interference with respect to the DL transmission) than other non-selected UEs in the set of UEs. The selected number of UEs within the sub-set of UEs may be equal to the number of UEs that may receive the SFI (e.g., based on the maximum payload size of the SFI). The base station may then transmit the PDCCH carrying the SFI to the selected sub-set of UEs.

In some examples, the base station may further transmit repetitions of the PDCCH carrying the SFI across a plurality of beams selected based on the sub-set of UEs. In addition, the base station may further apply one or more of a CRC enhancement, MCS enhancement, or power boost to the SFI transmitted to the sub-set of UEs or set of UEs defining the group of UEs.

Instead of, or in addition to, prioritizing the SFI to a group of UEs, the CLI incurred by the missed SFI may be further avoided or mitigated by acknowledgement-based cancelation of the SFI change from uplink resources to downlink resources in the set of resources of the slot. For example, the base station may receive an acknowledgement (ACK) from one or more UEs to which the SFI is transmitted. Based on the received ACKs, the base station may either modify a selected portion of the set of resources to maintain the selected portion of the resources as uplink resources irrespective of the slot format or cancel the SFI change by avoiding scheduling downlink transmissions in the set of resources of the slot.

Figure 12:
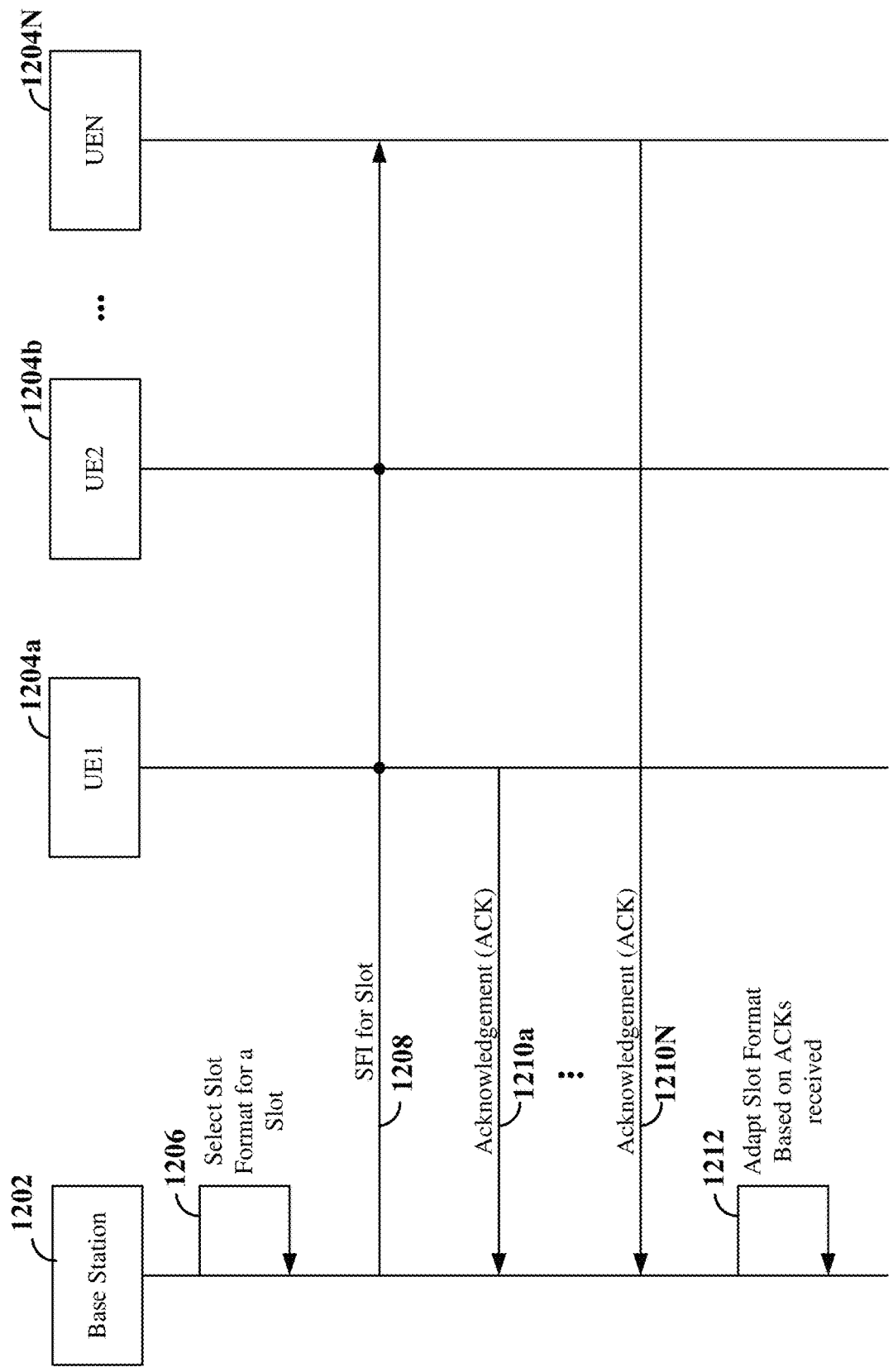
FIG. 12 is a signaling diagram illustrating an example of acknowledgement-based cancelation of a SFI according to some aspects.

FIG. 12 is a signaling diagram illustrating an example of acknowledgement-based cancelation of a SFI according to some aspects. In the example shown in FIG. 12, a base station 1202 (e.g., a gNB) is in wireless communication with a plurality of UEs 1204a, 1204b, . . . , 1204N. The base station 1202 may correspond to any of the scheduling entities or base stations shown in FIG. 1, 2, 5A, 6, 9, or 10 that may be configured to operate in the sub-band full-duplex mode. The UEs 1204a-1204N may correspond to any of the scheduled entities or UEs shown in FIG. 1, 2, 6, or 9.

At 1206, the base station 1202 may select a slot format for a slot. The slot may include a carrier bandwidth and communications with the UEs 1204a-1204N in the slot may occur across the carrier bandwidth or within one or more active bandwidth parts (BWPs) of the carrier bandwidth. The slot format may include, for example, one of a half-duplex slot in which at least a BWP of the slot is configured for either uplink transmission or downlink transmission, a sub-band full-duplex slot in which at least the BWP is configured for simultaneous uplink transmission and downlink transmission, or a flexible slot including at least one flexible symbol configurable as a half-duplex symbol or a sub-band full-duplex symbol. In some examples, the selected slot format changes a set of resources in the slot from uplink resources to downlink resources.

At 1208, the base station 1202 may transmit a slot format indicator (SFI) indicating the slot format to the plurality of UEs 1204a-1204N. In examples in which the selected slot format includes a flexible slot, the SFI may further indicate the particular configuration of the flexible symbols within the slot. The SFI may be included, for example, within DCI carried in a PDCCH or within a MAC-CE carried in a PDSCH. For example, the DCI may have DCI format 2_0, which is configured to carry group common control information (e.g., control information broadcast to a group of UEs) including an SFI information element (IE). The DCI may further include a set of cyclic redundancy check (CRC) bits that are scrambled with a radio network temporary identifier (RNTI), which may be an SFI specific RNTI, to allow the UE to determine the type of control information (e.g., SFI) sent in the PDCCH.

At 1210a . . . 1210N, the base station 1202 may receive a respective acknowledgement (ACK) of the SFI from at least a portion of the plurality of UEs 1204a-1204N. The ACK may be transmitted, for example, on a PUCCH, on UCI piggybacked on a PUSCH, or on an SRS. In some examples, the base station 1202 may fail to receive an ACK from a set of one or more of the plurality of UEs 1204 (e.g., the base station may receive a NACK or no HARQ feedback). In the example shown in FIG. 12, the base station 1202 fails to receive an ACK from UE 1204b.

At 1212, the base station 1202 may adapt the slot format of the slot based on the set of one or more UEs for which no ACK is received. In some examples, the base station 1202 may maintain a selected portion of the set of resources that are semi-persistently or periodically scheduled for uplink communication by the set of one or more UEs as uplink resources. In this example, the set of one or more UEs may transmit their semi-persistent or periodic uplink transmissions in the selected portion of the set of resources without interfering with any downlink transmissions scheduled in any remaining portion of the set of resources. Thus, the base station 1202 may adapt the downlink pre-emption of the set of resources by transmitting on the remaining portion of the set of resources (e.g., the resources associated with UEs that ACKed the cancelation of the uplink transmission). In the example shown in FIG. 12, the base station 1202 may maintain the uplink resources semi-persistently or periodically scheduled for uplink transmissions by UE 1204b.

In other examples, the base station 1202 may adapt the slot format of the slot by avoiding scheduling downlink transmissions in the set of resources of the slot. Thus, in this example, the base station 1202 may schedule downlink pre-emption transmissions only if an ACK is received from each of the intended recipients of the SFI (e.g., from each of the plurality of UEs 1204a-1204N).

Figure 13:
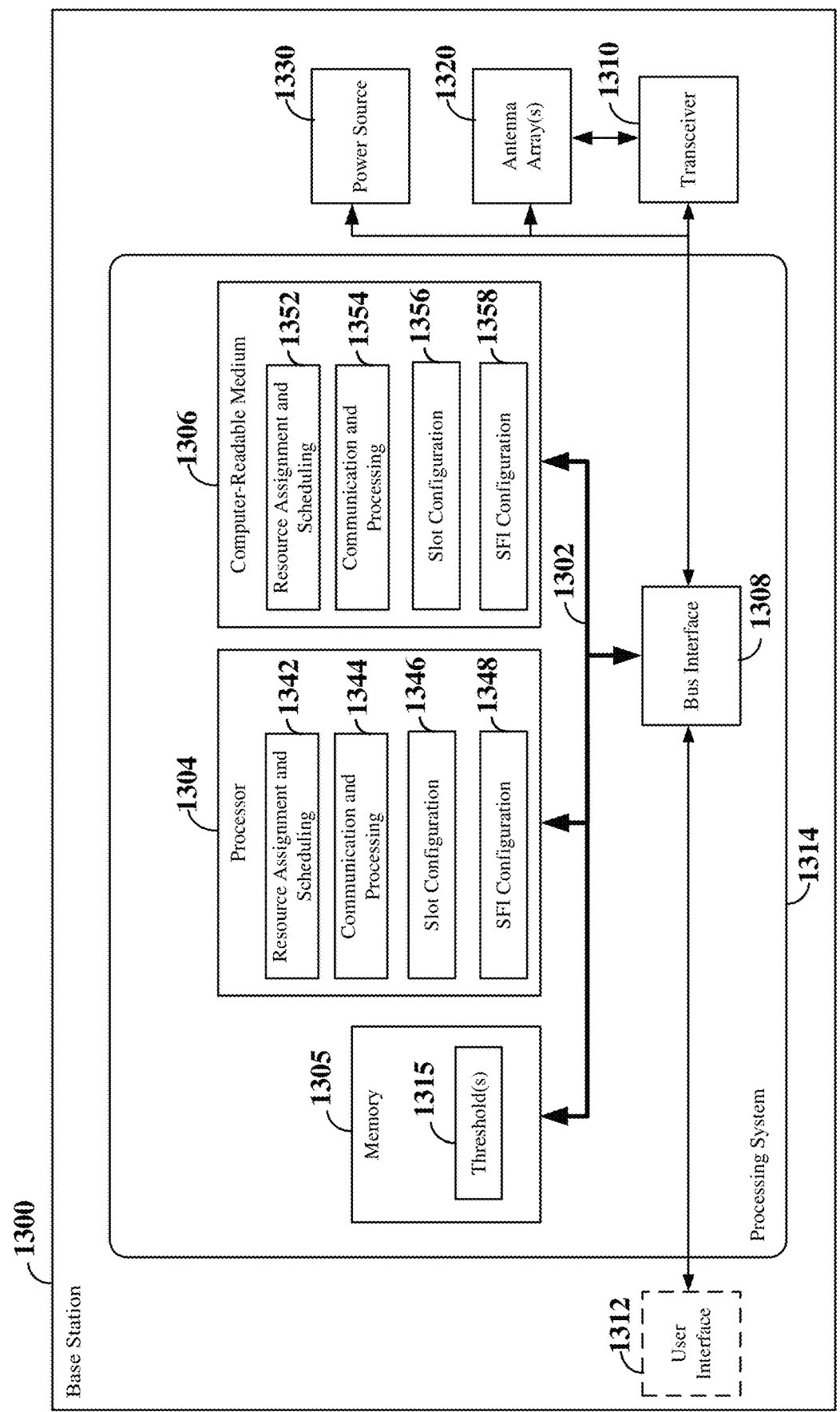
FIG. 13 is a block diagram illustrating an example of a hardware implementation for a base station employing a processing system according to some aspects.

FIG. 13 is a conceptual diagram illustrating an example of a hardware implementation for an exemplary base station 1300 employing a processing system 1314. For example, the base station 1300 may be a gNB or other scheduling entity as illustrated in any one or more of FIGS. 1, 2, 5A, 6, 9, 10, and/or 12.

The base station 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1300 may be configured to perform any one or more of the functions described herein. That is, the processor 1304, as utilized in a base station 1300, may be used to implement any one or more of the processes described below.

The processor 1304 may in some instances be implemented via a baseband or modem chip and in other implementations, the processor 1304 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The memory 1305 may store, for example, one or more threshold(s) 1315 that may be utilized by the processor 1304. For example, the one or more threshold(s) 1315 may include a threshold aggregation level, a threshold number of CRC bits (e.g., a CRC threshold), and/or a threshold transmit power.

The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a means for communicating with various other apparatus over a transmission medium (e.g., air interface) using antenna array(s) 1320 (e.g., each including one or more antenna panels). A user interface 1312 (e.g., keypad, display, touchscreen, speaker, microphone, control knobs, etc.) may also be provided. Of course, such a user interface 1312 is optional, and may be omitted in some examples.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. In some examples, the computer-readable medium 1306 may be part of the memory 1305. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include resource assignment and scheduling circuitry 1342, configured to generate, schedule, and modify a resource assignment or grant of time-frequency resources. For example, the resource assignment and scheduling circuitry 1342 may schedule time-frequency resources within a plurality of sub-bands or BWPs of one or more TDD half-duplex and/or FDD full-duplex subframes or slots to carry user data traffic and/or control information to and/or from multiple UEs.

In various aspects of the present disclosure, the resource assignment and scheduling circuitry 1342 may be configured to schedule a downlink transmission of a slot format indicator (SFI) for a slot to a plurality of UEs (e.g., a group of UEs). In some examples, the resource assignment and scheduling circuitry 1342 may schedule the downlink transmission of the SFI based on an aggregation level applied to a PDCCH carrying the SFI. The resource assignment and scheduling circuitry 1342 may further be configured to schedule downlink transmissions of repetitions of the SFI across a plurality of beams in DCI or MAC-CEs. For example, the resource assignment and scheduling circuitry 1342 may be configured to schedule the repetitions of the SFI within a plurality of concatenated CORESETs, each associated with a respective beam. The resource assignment and scheduling circuitry 1342 may further be configured to schedule a downlink transmission of a concatenation pattern of the plurality of concatenated CORESETs and a configuration of monitoring occasions associated with reception of the repetitions of the SFI by the plurality of UEs.

The resource assignment and scheduling circuitry 1342 may further schedule resources (e.g., within a PUCCH, PUSCH, or SRS) for receiving HARQ feedback (e.g., an ACK or NACK) for the SFI from the plurality of UEs. The resource assignment and scheduling circuitry 1342 may further schedule resources for downlink transmissions within a set of resources that has been re-configured from uplink resources to downlink resources by the SFI. In some examples, the resource assignment and scheduling circuitry 1342 may further semi-persistently schedule or periodically schedule uplink transmissions by the plurality of UEs within the set of resources. In addition, the resource assignment and scheduling circuitry 1342 may schedule downlink transmissions within only a portion (e.g., a remaining portion) of the set of resources utilized by UEs for which an ACK is received. The resource assignment and scheduling circuitry 1342 may further be configured to execute resource assignment and scheduling software 1352 stored in the computer-readable medium 1306 to implement one or more of the functions described herein.

The processor 1304 may further include communication and processing circuitry 1344 configured to communicate with the plurality of UEs in a sub-band full-duplex mode over a carrier bandwidth of a carrier frequency. In some examples, the communication and processing circuitry 1344 may include one or more hardware components that provide the physical structure that performs processes related to wireless communication (e.g., signal reception and/or signal transmission) and signal processing (e.g., processing a received signal and/or processing a signal for transmission).

In some implementations where the communication involves receiving information, the communication and processing circuitry 1344 may obtain information from a component of the base station 1300 (e.g., from the transceiver 1310 that receives the information via radio frequency signaling or some other type of signaling suitable for the applicable communication medium), process (e.g., decode) the information, and output the processed information. For example, the communication and processing circuitry 1344 may output the information to another component of the processor 1304, to the memory 1305, or to the bus interface 1308. In some examples, the communication and processing circuitry 1344 may receive one or more of signals, messages, other information, or any combination thereof. In some examples, the communication and processing circuitry 1344 may receive information via one or more channels. In some examples, the communication and processing circuitry 1344 may include functionality for a means for receiving. In some examples, the communication and processing circuitry 1344 may include functionality for a means for processing, including a means for demodulating, a means for decoding, etc.

In some implementations where the communication involves sending (e.g., transmitting) information, the communication and processing circuitry 1344 may obtain information (e.g., from another component of the processor 1304, the memory 1305, or the bus interface 1308), process (e.g., modulate, encode, etc.) the information, and output the processed information. For example, the communication and processing circuitry 1344 may output the information to the transceiver 1310 (e.g., that transmits the information via radio frequency signaling or some other type of signaling suitable for the applicable communication medium). In some examples, the communication and processing circuitry 1344 may send one or more of signals, messages, other information, or any combination thereof. In some examples, the communication and processing circuitry 1344 may send information via one or more channels. In some examples, the communication and processing circuitry 1344 may include functionality for a means for sending (e.g., a means for transmitting). In some examples, the communication and processing circuitry 1344 may include functionality for a means for generating, including a means for modulating, a means for encoding, etc.

The communication and processing circuitry 1344 may be configured to generate and transmit a slot format indicator (SFI) indicating a selected slot format of a slot to the plurality of UEs. In examples in which the selected slot format includes a flexible slot, the SFI may further indicate the particular configuration of the flexible symbols within the slot. The SFI may be transmitted, for example, within DCI carried in a PDCCH or within a MAC-CE carried in a PDSCH. For example, the DCI may have DCI format 2_0, which is configured to carry group common control information (e.g., control information broadcast to a group of UEs) including an SFI information element (IE).

In some examples, the communication and processing circuitry 1344 may be configured to generate the PDCCH carrying the SFI at an aggregation level that is greater than or equal to the threshold aggregation level 1315 to improve the reliability of the SFI transmission.

In some examples, the communication and processing circuitry 1344 may be configured to generate and transmit downlink beamformed signals at a mmWave frequency (e.g., FR2) or a sub-6 GHz frequency (e.g., FR1) via the transceiver 1310 and antenna array(s) 1320. For example, the communication and processing circuitry 1344 may be configured to generate and transmit repetitions of the SFI on a plurality of downlink beams. In addition, the communication and processing circuitry 1344 may be configured to transmit the SFI repetitions on multiple, concatenated control resource sets (CORESETs) based on the aggregation level. The communication and processing circuitry 1344 may further be configured to generate and transmit a concatenation pattern of the multiple concatenated CORESETs to the plurality of UEs via RRC signaling. Furthermore, the communication and processing circuitry 1344 may be configured to generate and transmit a configuration of monitoring occasions associated with reception by the UEs of the repetitions of the SFI via, for example, RRC signaling.

In some examples, the communication and processing circuitry 1344 may further be configured to generate a CRC (e.g., a set of CRC bits) for the SFI and append the CRC to the DCI containing the SFI. In addition, the communication and processing circuitry 1344 may scramble the CRC with a radio network temporary identifier (RNTI), which may be an SFI specific RNTI. In some examples, the communication and processing circuitry 1344 may increase the number of CRC bits appended to the DCI. For example, the base station may generate a PDCCH carrying the SFI with a number of CRC bits greater than a threshold number of CRC bits (e.g., CRC threshold) 1315. For example, the CRC threshold 1315 may be twenty-four bits. The communication and processing circuitry 1344 may, for example, increase the number of CRC bits to thirty or thirty-six CRC bits. In other examples, the communication and processing circuitry 1344 may be configured to segment a payload of the PDCCH carrying the SFI into two or more segments. A respective set of segment CRC bits may be generated for each segment. In addition, a set of global CRC bits may be generated for the PDCCH including the respective sets of segment CRC bits.

In some examples, the communication and processing circuitry 1344 may generate the PDCCH carrying the SFI using BPSK. In some examples, the communication and processing circuitry 1344 may be configured to control a power source 1330 to increase a transmit power of the PDCCH carrying the SFI above a threshold transmit power 1315. In some examples, the communication and processing circuitry 1344 may be configured to receive a respective acknowledgement from one or more of the plurality of UEs.

In some examples, the communication and processing circuitry 1344 may further be configured to prioritize transmission of the SFI to a group of UEs having semi-persistently scheduled or periodically scheduled uplink transmissions within a set of resources changed from uplink resources to downlink resources by the SFI. For example, the communication and processing circuitry 1344 may be configured to apply an aggregation level corresponding to at least a threshold aggregation level based on the group of UEs. As another example, the communication and processing circuitry 1344 may be configured to repeat transmission of the SFI across a plurality of beams selected based on the group of UEs. The communication and processing circuitry 1344 may further be configured to apply a CRC enhancement, MCS enhancement, or transmit power enhancement to the SFI transmitted to the group of UEs.

The communication and processing circuitry 1344 may further be configured to communicate uplink and/or downlink transmissions within the slot based on the SFI. For example, if the SFI indicates that the slot is a DL half-duplex slot, the communication and processing circuitry 1344 may be configured to transmit DL control and/or DL data in the slot. As another example, if the SFI indicates that the slot is an UL half-duplex slot, the communication and processing circuitry 1344 may be configured to receive UL data and/or UL control in the slot. As yet another example, if the SFI indicates that the slot is a sub-band full-duplex slot, the communication and processing circuitry 1344 may be configured to transmit DL control and/or DL data within one or more DL sub-bands of the slot and to receive UL control and/or UL data within one or more UL sub-bands of the slot. In some examples, if the SFI indicates the configuration of one or more symbols of a flexible slot, the communication and processing circuitry 1344 may be configured to transmit and/or receive control and/or data in each symbol of slot based on the configuration of each symbol (e.g., as half-duplex symbols or sub-band full-duplex symbols). The communication and processing circuitry 1344 may further be configured to execute communication and processing software 1354 stored in the computer-readable medium 1306 to implement one or more of the functions described herein.

The processor 1304 may further include slot configuration circuitry 1346, configured to select a slot format of a slot having a carrier bandwidth. The selected slot format may include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. The slot configuration circuitry 1346 may further be configured to adapt the slot format of the slot based on the SFI acknowledgements received from the plurality of UEs. For example, the communication and processing circuitry 1344 may fail to receive an acknowledgement from a set of one or more UEs. In this example, the slot configuration circuitry 1346 may be configured to maintain a selected portion of the set of resources that are semi-persistently or periodically scheduled for uplink communication by the set of one or more UEs as uplink resources. Thus, the slot configuration circuitry 1346 may adapt the downlink pre-emption of the set of resources by configuring the resource assignment and scheduling circuitry 1342 and communication and processing circuitry 1344 to enable downlink transmission on only the remaining portion of the set of resources (e.g., the resources associated with UEs that ACKed the SFI).

In other examples, the slot configuration circuitry 1346 may adapt the slot format of the slot by avoiding scheduling downlink transmissions in the set of resources of the slot. Thus, in this example, the slot configuration circuitry 1346 may instruct the resource assignment and scheduling circuitry 1342 to schedule downlink pre-emption transmissions only if an ACK is received from each of the intended recipients of the SFI. The slot configuration circuitry 1346 may further be configured to execute slot configuration software 1356 stored in the computer-readable medium 1306 to implement one or more of the functions described herein.

The processor 1304 may further include SFI configuration circuitry 1348, configured to generate a SFI indicating the slot format of the slot selected by the slot configuration circuitry 1346. The SFI configuration circuitry 1348 may further be configured to instruct the communication and processing circuitry 1344 to transmit the SFI via a PDCCH or MAC-CE.

In some examples, the SFI configuration circuitry 1348 may further be configured to boost the reliability of an SFI transmission using various mechanisms. In some examples, the SFI configuration circuitry 1348 may be configured to set an aggregation level greater than or equal to a threshold aggregation level 1315 for the SFI. The SFI configuration circuitry 1348 may further be configured to set the threshold aggregation level 1315 based on at least one of a carrier frequency of the slot, a coverage of a cell served by the base station 1300, or a bandwidth of an active downlink bandwidth part utilized for communication with the plurality of UEs.

The SFI configuration circuitry 1348 may further be configured to instruct the resource assignment and scheduling circuitry 1342 and communication and processing circuitry 1344 to transmit repetitions of the SFI on a plurality of downlink beams. For example, the SFI configuration circuitry 1348 may be configured to configure a plurality of concatenated control resource sets (CORESETs) for transmission of the repetitions of the SFI based on the aggregation level. Each CORESET may be utilized for transmission of a respective repetition of the SFI on a respective beam. Thus, each CORESET may be associated with a respective TCI state indicating the beam on which to transmit the repetition of the SFI.

In some examples, the SFI configuration circuitry 1348 may further be configured to instruct the communication and processing circuitry 1344 to utilize the CRC threshold 1315, BPSK, and/or threshold transmit power 1315 in generating and transmitting the PDCCH carrying the SFI. In some examples, the SFI configuration circuitry 1348 may further be configured to instruct the communication and processing circuitry 1344 to segment the SFI payload into two or more segments, generate a respective segment CRC for each segment, and generate a global CRC for the PDCCH.

In some examples, the SFI configuration circuitry 1348 may further be configured to identify a group of UEs having respective semi-persistently scheduled or periodically scheduled uplink transmissions within a set of resources changed from uplink resources to downlink resources by the SFI. The SFI configuration circuitry 1348 may further be configured to prioritize transmission of the SFI to the group of UEs. For example, the SFI configuration circuitry 1348 may be configured to select, as the group of UEs, a sub-set of UEs from a set of UEs having semi-persistently scheduled or periodically scheduled transmissions within the set of resources based on an aggregation level to be applied to the SFI. The sub-set of UEs may correspond to a maximum number of UEs that may be included in the group of UEs to which the group common control information containing the SFI may be transmitted. The maximum number of UEs may be determined from the aggregation level. In some examples, the aggregation level may be limited by a maximum payload size of the SFI as determined by the CORESET size that the UEs are configured to monitor.

The SFI configuration circuitry 1348 may be configured to prioritize the transmission of the SFI to the group of UEs by applying an aggregation level greater than a threshold aggregation level selected based on the group of UEs. For example, the selected aggregation level may be limited by the maximum SFI payload size supported by the UEs. The SFI configuration circuitry 1348 may further be configured to prioritize transmission of the SFI to the group of UEs by selecting a plurality of beams for transmission of repetitions of the SFI based on the group of UEs. For example, the selected beams may include active downlink beams utilized for communication with the group of UEs.

The SFI configuration circuitry 1348 may further be configured to prioritize transmission of the SFI to the group of UEs by instructing the communication and processing circuitry 1344 to utilize an extended CRC (or segment-wise CRC), BPSK modulation, and/or increased transmit power in generating and transmitting the SFI to the group of UEs. The SFI configuration circuitry 1348 may further be configured to execute SFI configuration software 1358 stored in the computer-readable medium 1306 to implement one or more of the functions described herein.

Figure 14:
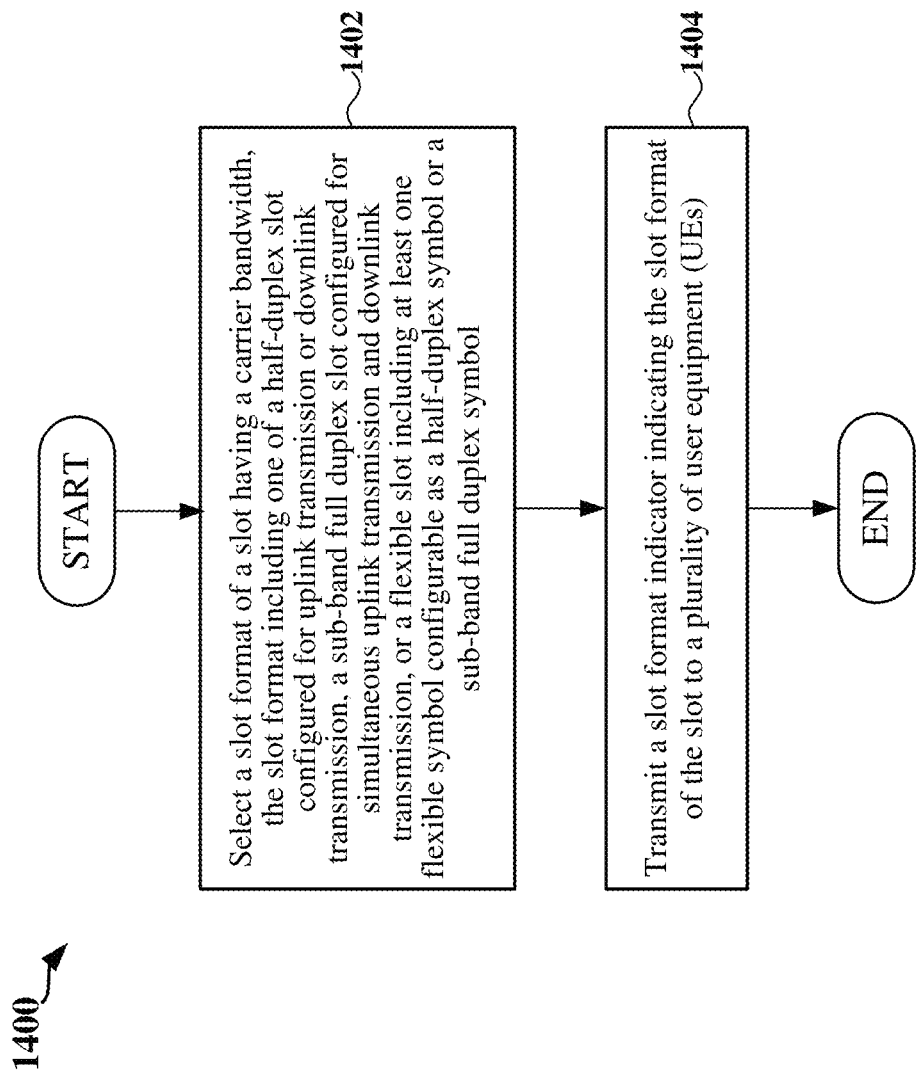
FIG. 14 is a flow chart of an exemplary method for SFI enhancement for sub-band full-duplex at a base station according to some aspects.

FIG. 14 is a flow chart 1400 of a method for SFI enhancement for sub-band full-duplex at a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1402, the base station may select a slot format of a slot. The slot may include a carrier bandwidth and communications in the slot with a plurality of UEs may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. For example, the slot configuration circuitry 1346 shown and described above in connection with FIG. 13 may provide a means to select the slot format of the slot.

At block 1404, the base station may transmit a slot format indicator (SFI) indicating the slot format to a plurality of UEs. In some examples, the SFI may be carried in downlink control information (e.g., group common control information) mapped to a downlink control channel (e.g., a PDCCH) or within a MAC-CE mapped to a downlink data channel (e.g., a PDSCH).

In some examples, the base station may apply an aggregation level greater than or equal to a threshold aggregation level to a control channel (e.g., PDCCH) carrying the slot format indicator. The base station may further set the threshold aggregation level based on at least one of a carrier frequency associated with the carrier bandwidth, a coverage of a cell served by the base station, or a bandwidth of an active downlink bandwidth part.

In some examples, the base station may further transmit repetitions of the SFI across a plurality of beams in DCI or MAC-CEs. For example, the base station may configure a plurality of concatenated control resource sets (CORESETs) for transmission of the repetitions of the SFI across the plurality of beams. Each CORESET within the plurality of concatenated CORESETs may be associated with transmission of a respective repetition of the slot format indicator on a respective beam of the plurality of beams. For example, a respective TCI state may be associated with each CORESET. The base station may further transmit a concatenation pattern of the plurality of concatenated CORESETs to the plurality of UEs. In addition, the base station may transmit a configuration of monitoring occasions associated with reception by the plurality of UEs of the repetitions of the SFI on each of the plurality of beams.

In some examples, the base station may further generate a control channel (e.g., PDCCH) carrying the SFI with a number of CRC bits greater than a threshold number. In some examples, the base station may segment a payload of the control channel containing the SFI into at least two segments, generate a respective set of segment CRC bits for each of the at least two segments, and generate a set of global CRC bits for the payload and the respective sets of segment CRC bits. In some examples, the base station may further generate the control channel carrying the SFI using BPSK modulation. In some examples, the base station may transmit the SFI at a transmit power above a threshold transmit power.

In some examples, the SFI may change a set of resources in the slot from uplink resources to downlink resources. In this example, the base station may further identify a group of UEs having respective semi-persistently scheduled or periodically scheduled uplink transmissions within the set of resources and prioritize transmission of the SFI to the group of UEs. Here, the group of UEs corresponds to the plurality of UEs. For example, the base station may apply an aggregation level greater than or equal to a threshold aggregation level to a control channel carrying the SFI based on the group of UEs. As an example, the base station may select, as the group of UEs, a sub-set of UEs from a set of UEs having respective semi-persistently scheduled or periodically scheduled uplink transmissions within the set of resources based on the aggregation level. The sub-set of UEs may each have a respective transmit beam configured to produce a higher interference level within the set of resources than non-selected UEs in the set of UEs. In other examples, the base station may repeat transmission of the SFI across a plurality of beams selected based on the group of UEs. For example, the SFI configuration circuitry 1348, together with the communication and processing circuitry 1344, transceiver 1310, antenna array(s) 1320, and power source 1330 shown and described above in connection with FIG. 13 may provide a means to transmit the SFI to the plurality of UEs.

The process shown in FIG. 14 may include additional aspects, such as any single aspect or any combination of aspects described above and/or in connection with one or more other processes described elsewhere herein. For example, the base station may further fail to receive an acknowledgment of the SFI from a set of one or more UEs of the plurality of UEs. When the SFI changes a set of resources in the slot from uplink resources to downlink resources, the base station may further adapt the slot format of the slot based on the set of one or more UEs. For example, the base station may maintain a selected portion of the uplink resources semi-persistently or periodically scheduled for uplink communication by the set of one or more UEs. As another example, the base station may avoid scheduling downlink transmissions in the set of resources of the slot.

In one configuration, a base station 1300, such as a gNB, includes means for performing the various functions and processes described in relation to FIG. 14. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 5A, 6, 9, 10, and/or 12, and utilizing, for example, the processes and/or algorithms described herein in relation to FIGS. 11 and 14.

Figure 15:
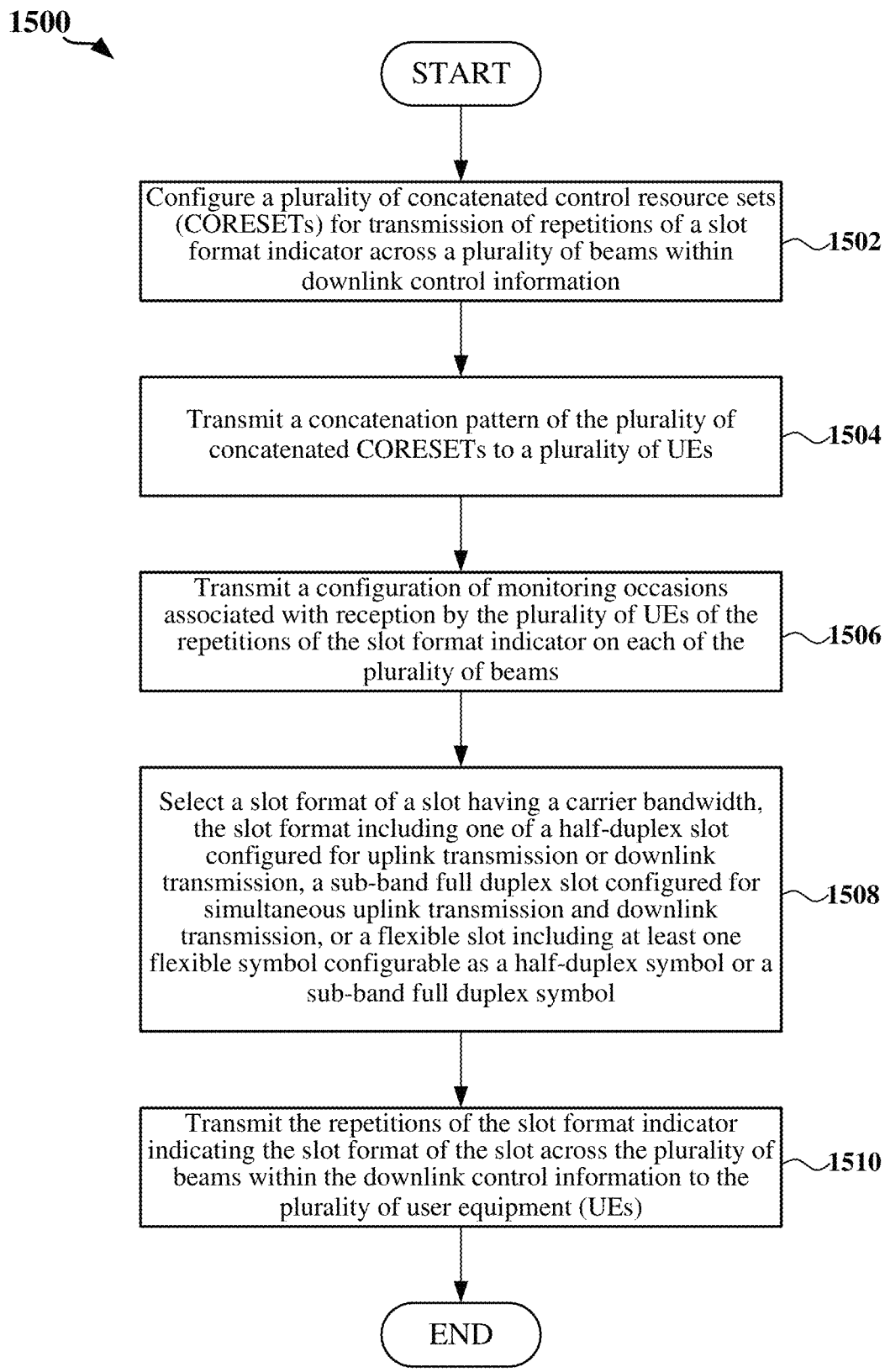
FIG. 15 is a flow chart of another exemplary method for SFI enhancement for sub-band full-duplex at a base station according to some aspects.

FIG. 15 is a flow chart 1500 of another method for SFI enhancement for sub-band full-duplex at a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1502, the base station may configure a plurality of concatenated control resource sets (CORESETs) for transmission of repetitions of a slot format indicator (SFI) across a plurality of beams within downlink control information. Each CORESET within the plurality of concatenated CORESETs may be associated with transmission of a respective repetition of the slot format indicator on a respective beam of the plurality of beams. For example, a respective TCI state may be associated with each CORESET. For example, the SFI configuration circuitry 1348 shown and described above in connection with FIG. 13 may provide a means to configure the plurality of concatenated CORESETs.

At block 1504, the base station may transmit a concatenation pattern of the plurality of concatenated CORESETs to the plurality of UEs. For example, the SFI configuration circuitry 1348, together with the communication and processing circuitry 1344 and transceiver 1310, shown and described above in connection with FIG. 13 may provide a means to transmit the concatenation pattern.

At block 1506, the base station may transmit a configuration of monitoring occasions associated with reception by the plurality of UEs of the repetitions of the SFI on each of the plurality of beams. For example, the SFI configuration circuitry 1348, together with the communication and processing circuitry 1344 and transceiver 1310, shown and described above in connection with FIG. 13 may provide a means to transmit the configuration of the monitoring occasions.

At block 1508, the base station may select a slot format of a slot. The slot may include a carrier bandwidth and communications in the slot with a plurality of UEs may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. For example, the slot configuration circuitry 1346 shown and described above in connection with FIG. 13 may provide a means to select the slot format of the slot.

At block 1510, the base station may transmit repetitions of the SFI indicating the slot format across the plurality of beams within the downlink control information to the plurality of UEs. For example, the SFI configuration circuitry 1348, together with the communication and processing circuitry 1344, transceiver 1310, and antenna array(s) 1320 shown and described above in connection with FIG. 13 may provide a means to transmit the repetitions of the SFI to the plurality of UEs.

Figure 16:
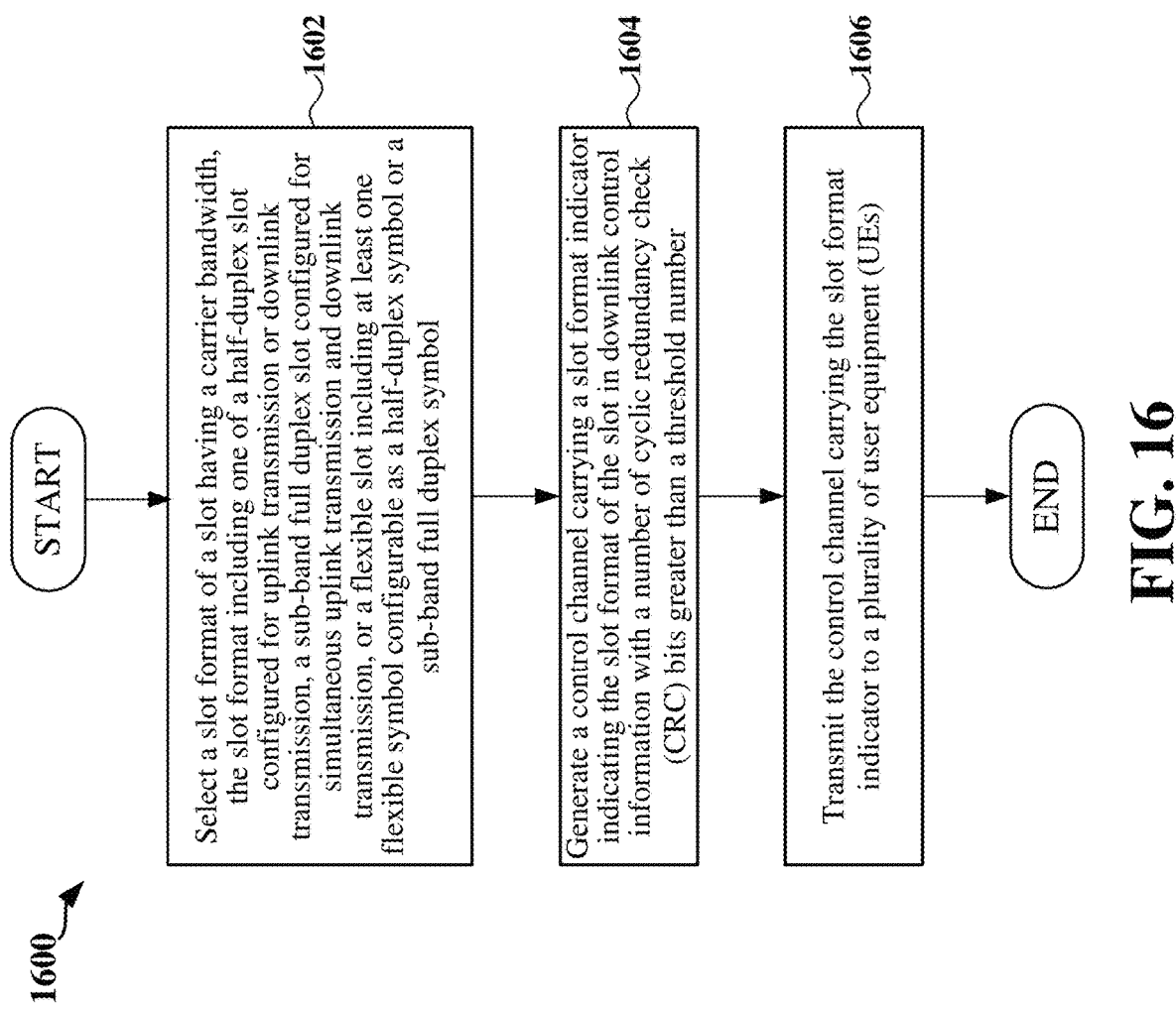
FIG. 16 is a flow chart of another exemplary method for SFI enhancement for sub-band full-duplex at a base station according to some aspects.

FIG. 16 is a flow chart 1600 of another method for SFI enhancement for sub-band full-duplex at a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1602, the base station may select a slot format of a slot. The slot may include a carrier bandwidth and communications in the slot with a plurality of UEs may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. For example, the slot configuration circuitry 1346 shown and described above in connection with FIG. 13 may provide a means to select the slot format of the slot.

At block 1604, the base station may generate a control channel carrying a slot format indicator (SFI) indicating the slot format of the slot in downlink control information with a number of cyclic redundancy check (CRC) bits greater than a threshold number. For example, the SFI configuration circuitry 1348, together with the communication and processing circuitry 1344, shown and described above in connection with FIG. 13 may provide a means to generate the control channel carrying the SFI.

At block 1606, the base station may transmit the control channel carrying the slot format indicator (SFI) indicating the slot format to a plurality of UEs. For example, the SFI configuration circuitry 1348, together with the communication and processing circuitry 1344, and transceiver 1310, shown and described above in connection with FIG. 13 may provide a means to transmit the control channel carrying the SFI to the plurality of UEs.

Figure 17:
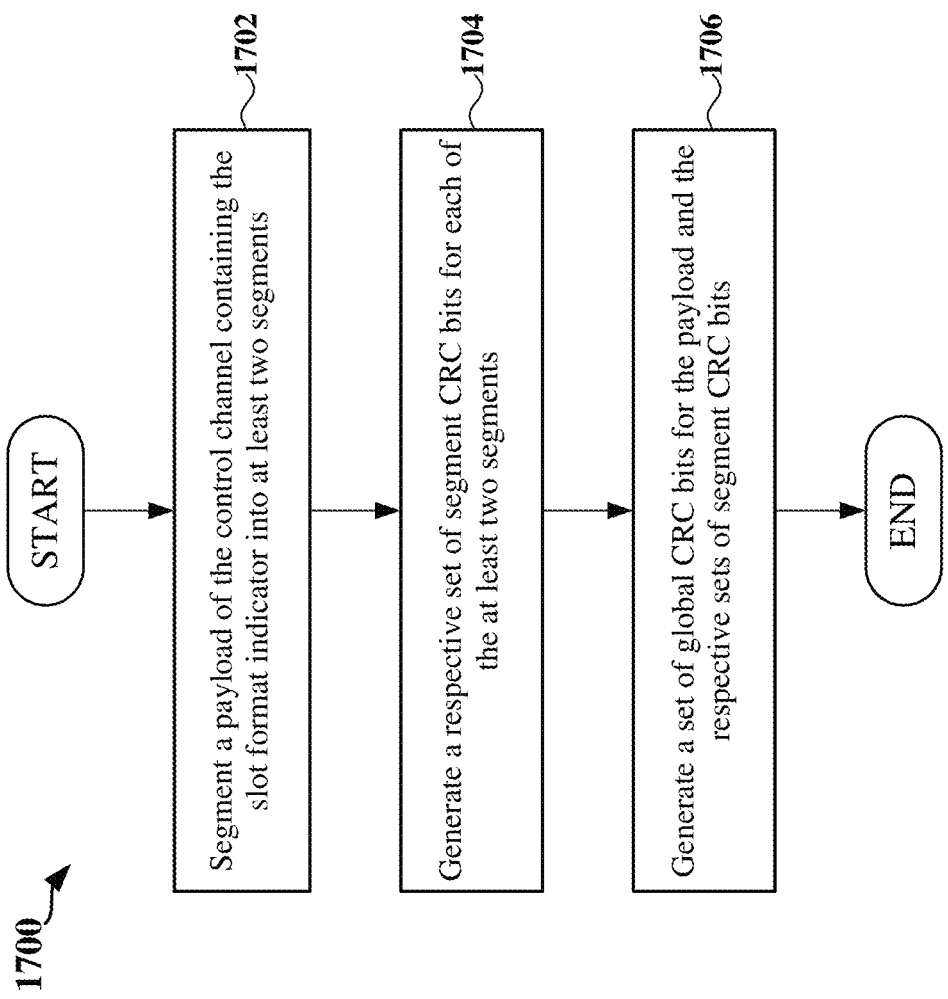
FIG. 17 is a flow chart of an exemplary method for generating a control channel carrying a slot format indicator at a base station according to some aspects.

FIG. 17 is a flow chart 1700 of a method for generating a control channel carrying a slot format indicator at a base station according to some aspects. The method may correspond, for example, to block 1604 shown in FIG. 16. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1702, the base station may segment a payload of the control channel containing the slot format indicator into at least two segments. For example, the SFI configuration circuitry 1348, together with the communication and processing circuitry 1344, shown and described above in connection with FIG. 13 may provide a means to segment the payload of the control channel.

At block 1704, the base station may generate a respective set of segment CRC bits for each of the at least two segments. For example, the SFI configuration circuitry 1348, together with the communication and processing circuitry 1344, shown and described above in connection with FIG. 13 may provide a means to generate the respective sets of segment CRC bits.

At block 1706, the base station may generate a set of global CRC bits for the payload and the respective sets of segment CRC bits. For example, the SFI configuration circuitry 1348, together with the communication and processing circuitry 1344, shown and described above in connection with FIG. 13 may provide a means to generate the set of global CRC bits.

Figure 18:
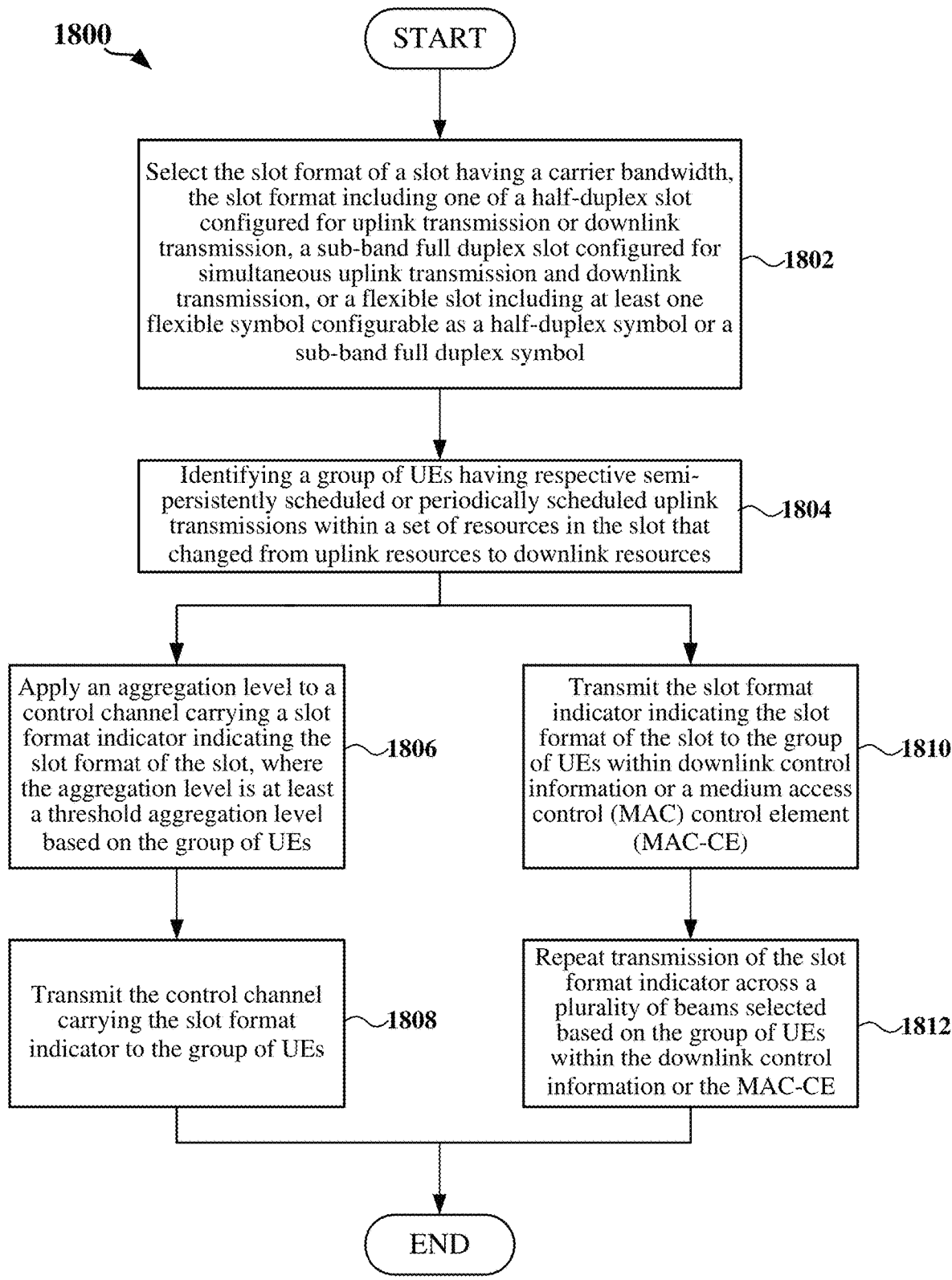
FIG. 18 is a flow chart of another exemplary method for SFI enhancement for sub-band full-duplex at a base station according to some aspects.

FIG. 18 is a flow chart 1800 of another method for SFI enhancement for sub-band full-duplex at a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1802, the base station may select a slot format of a slot. The slot may include a carrier bandwidth and communications in the slot with a plurality of UEs may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. For example, the slot configuration circuitry 1346 shown and described above in connection with FIG. 13 may provide a means to select the slot format of the slot.

At block 1804, the base station may identify a group of UEs having respective semi-persistently scheduled or periodically scheduled uplink transmissions within a set of resources in the slot that changed from uplink resources to downlink resources. For example, the SFI configuration circuitry 1348 shown and described above in connection with FIG. 13 may provide a means to identify the group of UEs.

At blocks 1806 and 1808, the base station may then apply an aggregation level to a control channel carrying a slot format indicator indicating the slot format of the slot, where the aggregation level is at least a threshold aggregation level based on the group of UEs, and transmit the control channel carrying the slot format indicator to the group of UEs. For example, the SFI configuration circuitry 1348, together with the communication and processing circuitry 1344 and transceiver 1310, shown and described above in connection with FIG. 13 may provide a means to apply the aggregation level to the control channel carrying the SFI and transmit the control channel carrying the SFI to the group of UEs.

Alternatively, at blocks 1810 and 1812, the base station may transmit the slot format indicator indicating the slot format of the slot to the group of UEs within downlink control information or a medium access control (MAC) control element (MAC-CE) and repeat transmission of the slot format indicator across a plurality of beams selected based on the group of UEs within the downlink control information or the MAC-CE. For example, SFI configuration circuitry 1348, together with the communication and processing circuitry 1344, transceiver 1310, and antenna array(s) 1320, shown and described above in connection with FIG. 13 may provide a means to transmit the SFI and repeat transmission of the SFI to the group of UEs.

Figure 19:
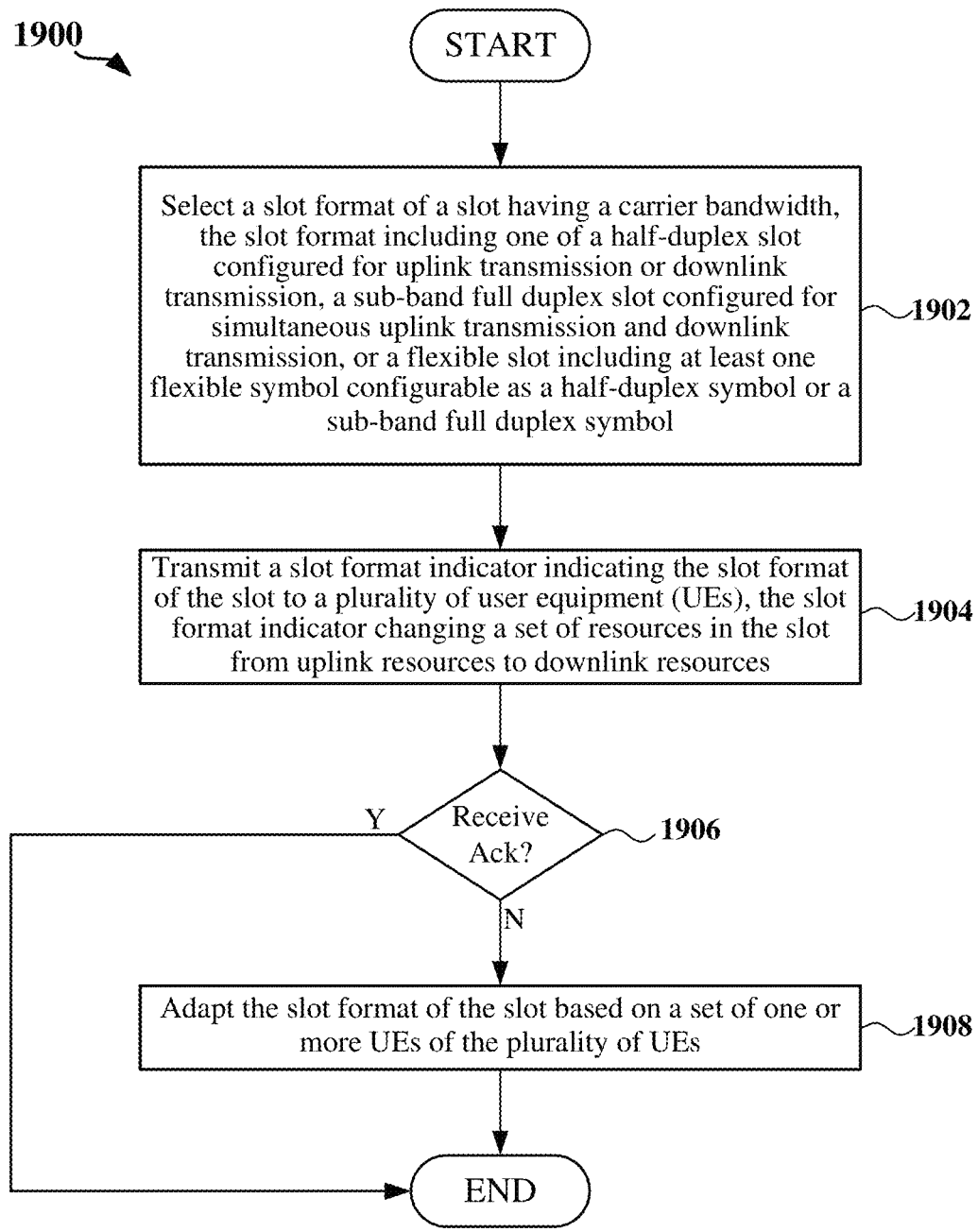
FIG. 19 is a flow chart of another exemplary method for SFI enhancement for sub-band full-duplex at a base station according to some aspects.

FIG. 19 is a flow chart 1900 of another method for SFI enhancement for sub-band full-duplex at a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1902, the base station may select a slot format of a slot. The slot may include a carrier bandwidth and communications in the slot with a plurality of UEs may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. For example, the slot configuration circuitry 1346 shown and described above in connection with FIG. 13 may provide a means to select the slot format of the slot.

At block 1904, the base station may transmit a slot format indicator (SFI) indicating the slot format to a plurality of UEs. In some examples, the SFI may be carried in downlink control information (e.g., group common control information) mapped to a downlink control channel (e.g., a PDCCH) or within a MAC-CE mapped to a downlink data channel (e.g., a PDSCH). For example, SFI configuration circuitry 1348, together with the communication and processing circuitry 1344 and transceiver 1310, shown and described above in connection with FIG. 13 may provide a means to transmit the SFI to the plurality of UEs.

At block 1906, the base station may determine whether an acknowledgment (ACK) of the slot format indicator is received from a set of one or more UEs of the plurality of UEs. For example, the communication and processing circuitry 1344 shown and described above in connection with FIG. 13 may provide a means to determine whether an ACK is received from the set of one or more UEs.

If the ACK is not received from the set of one or more UEs, at block 1908, the base station may adapt the slot format of the slot based on the set of one or more UEs of the plurality of UEs. In some examples, the base station may adapt the slot format by maintaining a selected portion of the uplink resources semi-persistently or periodically scheduled for uplink communication by the set of one or more UEs. In other examples, the base station may adapt the slot format by avoiding scheduling downlink transmissions in the set of resources of the slot. For example, the slot configuration circuitry 1346 shown and described above in connection with FIG. 13 may provide a means to adapt the slot format of the slot based on the set of one or more UEs that failed to acknowledge the SFI.

Figure 20:
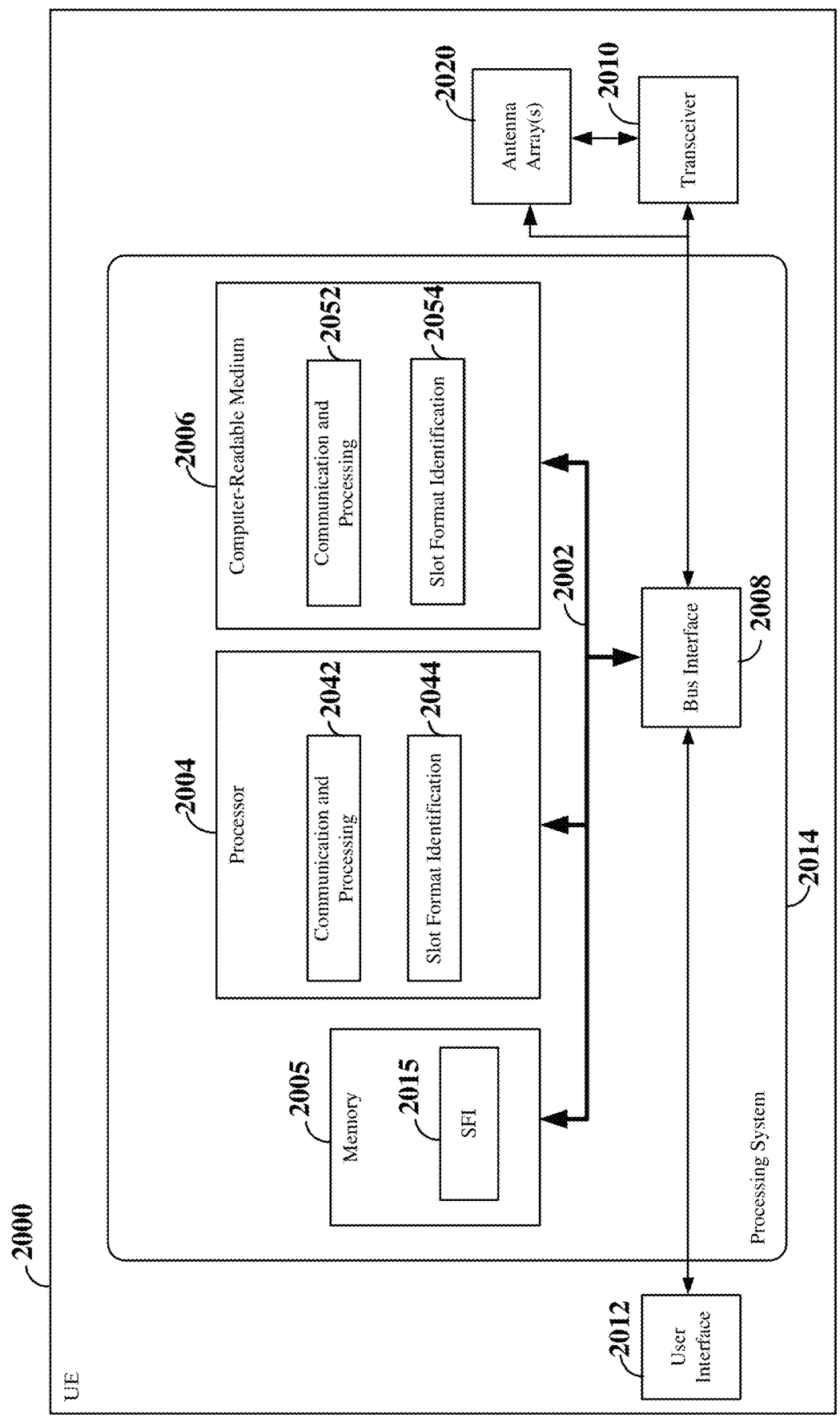
FIG. 20 is a block diagram illustrating an example of a hardware implementation for a UE employing a processing system according to some aspects.

FIG. 20 is a block diagram illustrating an example of a hardware implementation for a UE 2000 employing a processing system 2014. For example, the UE 2000 may correspond to any of the UEs or scheduled entities shown and described above in reference to FIGS. 1, 2, 6, 9, and/or 12.

In accordance with various aspects of the disclosure, an element, or any portion of an element, or any combination of elements may be implemented with a processing system 2014 that includes one or more processors 2004. The processing system 2014 may be substantially the same as the processing system 1314 illustrated in FIG. 13, including a bus interface 2008, a bus 2002, memory 2005, a processor 2004, and a computer-readable medium 2006. Furthermore, the UE 2000 may include a user interface 2012 and a transceiver 2010 substantially similar to those described above in FIG. 13. That is, the processor 2004, as utilized in a UE 2000, may be used to implement any one or more of the processes described below.

In some aspects of the disclosure, the processor 2004 may include circuitry configured for various functions. For example, the processor 2004 may include communication and processing circuitry 2042 configured to communicate with a base station, such as a gNB, in a sub-band full-duplex mode via the transceiver 2010 and antenna array(s) 2020. The communication and processing circuitry 2042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 2042 may be configured to exchange control information and data with the base station via one or more subframes, slots, and/or mini-slots.

In some examples, the communication and processing circuitry 2042 may be configured to receive a slot format indicator (SFI) 2015 indicating a slot format of a slot from the base station. The slot may include a carrier bandwidth and communications in the slot with the base station may occur across the carrier bandwidth or within one or more active bandwidth part (BWPs) of the carrier bandwidth. The SFI may be received, for example, within DCI carried in a PDCCH or within a MAC-CE carried in a PDSCH. For example, the DCI may have DCI format 2_0, which is configured to carry group common control information (e.g., control information broadcast to a group of UEs) including an SFI information element (IE). The SFI 2015 may be stored, for example, in memory 2005.

In some examples, the communication and processing circuitry 2042 may be configured to receive the PDCCH carrying the SFI at an aggregation level that is greater than or equal to the threshold aggregation level.

In some examples, the communication and processing circuitry 2042 may be configured to receive downlink beamformed signals at a mmWave frequency or a sub-6 GHz frequency via the transceiver 2010 and antenna array(s) 2020. For example, the communication and processing circuitry 2042 may be configured to receive repetitions of the SFI across a plurality of downlink beams. In addition, the communication and processing circuitry 2042 may be configured to monitor a plurality of search space sets within at least one monitoring occasion for a plurality of concatenated control resource sets (CORESETs) including the repetitions of the slot format indicator. Each CORESET within the plurality of concatenated CORESETs can include a respective repetition of the slot format indicator transmitted on a respective beam of the plurality of beams. In this example, a respective TCI state may be associated with each CORESET of the plurality of concatenated CORESETs. The communication and processing circuitry 2042 may further be configured to combine the repetitions of the SFI to produce a combined SFI.

In some examples, the communication and processing circuitry 2042 may further be configured to receive a concatenation pattern of the plurality of concatenated CORESETs from the base station via RRC signaling. Furthermore, the communication and processing circuitry 2042 may be configured to receive a configuration of the at least one monitoring occasion from the base station via, for example, RRC signaling.

In some examples, the communication and processing circuitry 2042 may further be configured to receive the PDCCH carrying the SFI with a number of CRC bits greater than a threshold number (e.g., CRC threshold). For example, the CRC threshold may be twenty-four bits. In some examples, the communication and processing circuitry 2042 may be configured to receive the PDCCH including at least two segments of a payload containing the SFI. Each of the at least two segments may include a respective set of segment CRC bits and the PDCCH may further include a set of global CRC bits.

In some examples, the communication and processing circuitry 2042 may be configured to receive a BPSK modulated PDCCH carrying the SFI. In some examples, the communication and processing circuitry 2042 may be configured to receive the SFI transmitted at a transmit power above a threshold transmit power. The communication and processing circuitry 2042 may further be configured to execute communication and processing software 2052 stored in the computer-readable medium 2006 to implement one or more of the functions described herein.

The processor 2004 may further include slot format identification circuitry 2044, configured to identify a slot format indicated by the SFI 2015. The slot format identification circuitry 2044 may further be configured to instruct the communication and processing circuitry 2042 to communicate uplink and/or downlink transmissions within the slot based on the SFI 2015. For example, if the SFI 2015 indicates that the slot is a DL half-duplex slot, the slot format identification circuitry 2044 may configure the communication and processing circuitry 2042 to receive DL control and/or DL data in the slot. As another example, if the SFI 2015 indicates that the slot is an UL half-duplex slot, the slot format identification circuitry 2044 may configure the communication and processing circuitry 2042 to transmit UL data and/or UL control in the slot. As yet another example, if the SFI 2015 indicates that the slot is a sub-band full-duplex slot, the slot format identification circuitry 2044 may configure the communication and processing circuitry 2042 to receive DL control and/or DL data within one or more DL sub-bands of the slot and to transmit UL control and/or UL data within one or more UL sub-bands of the slot. In some examples, if the SFI 2015 indicates the configuration of one or more symbols of a flexible slot, the slot format identification circuitry 2044 may configure the communication and processing circuitry 2042 to transmit and/or receive control and/or data in each symbol of slot based on the configuration of each symbol (e.g., as half-duplex symbols or sub-band full-duplex symbols). The slot format identification circuitry 2044 may further be configured to execute slot format identification software 2054 stored in the computer-readable medium 2006 to implement one or more of the functions described herein.

Figure 21:
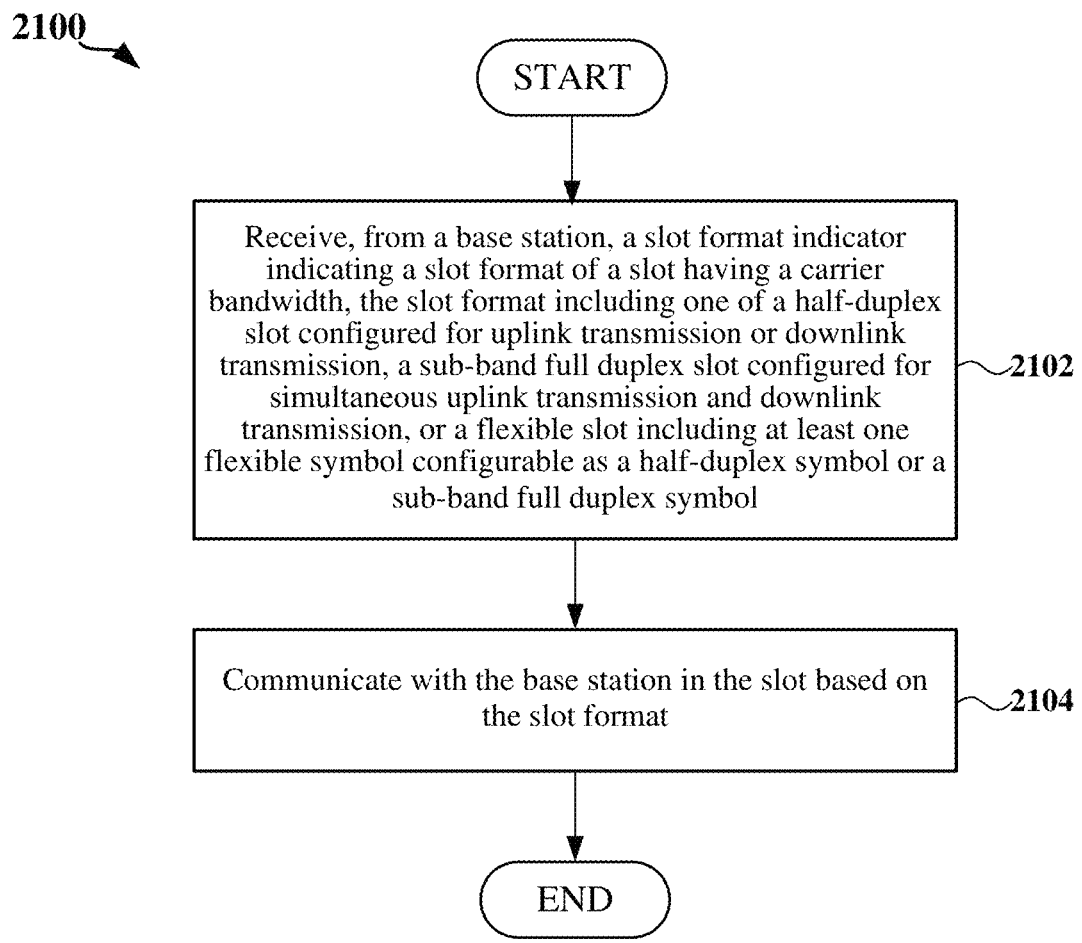
FIG. 21 is a flow chart of an exemplary method for SFI enhancement for sub-band full-duplex at a UE according to some aspects.

FIG. 21 is a flow chart 2100 of a method for SFI enhancement for sub-band full-duplex at a UE according to some aspects. As described below, some or all illustrated features may be omitted in a particular implementation within the scope of the present disclosure, and some illustrated features may not be required for implementation of all embodiments. In some examples, the method may be performed by the UE 2000, as described above and illustrated in FIG. 20, by a processor or processing system, or by any suitable means for carrying out the described functions.

At block 2102, the UE may receive, from a base station, a slot format indicator (SFI) indicating a slot format of a slot. The slot may include a carrier bandwidth and communications in the slot with the base station may occur across the carrier bandwidth or within one or more active bandwidth part (BWPs) of the carrier bandwidth. The slot format can include one of a half-duplex slot configured for uplink transmission or downlink transmission, a sub-band full-duplex slot configured for simultaneous uplink transmission and downlink transmission, or a flexible slot including at least one flexible symbol configurable as a half-duplex symbol or a sub-band full-duplex symbol. In some examples, the SFI may be carried in downlink control information (e.g., group common control information)

mapped to a downlink control channel (e.g., a PDCCH) or within a MAC-CE mapped to a downlink data channel (e.g., a PDSCH).

In some examples, the UE may receive a control channel (e.g., a PDCCH) carrying the SFI having an aggregation level of at least a threshold aggregation level. In some examples, the UE may receive repetitions of the SFI in DCI or MAC-CEs across a plurality of beams. For example, the UE may monitor a plurality of search space sets within at least one monitoring occasion for a plurality of concatenated control resource sets (CORESETs) including the repetitions of the slot format indicator. Each CORESET within the plurality of concatenated CORESETs can include a respective repetition of the SFI on a respective beam of the plurality of beams. The UE may further combine the repetitions of the SFI to produce a combined SFI. In some examples, the UE may further receive a concatenation pattern of the plurality of concatenated CORESETs from the base station. In some examples, the UE may further receive a configuration of the at least one monitoring occasion from the base station. In some examples, a respective TCI state is associated with each CORESET of the plurality of concatenated CORESETs.

In some examples, the UE may receive a control channel carrying the slot format indicator with a number of cyclic redundancy check (CRC) bits greater than a threshold number. In some examples, the UE may receive the control channel including at least two segments of a payload containing the slot format indicator. Each of the at least two segments can include a respective set of segment CRC bits and the control channel can further include a set of global CRC bits. In some examples, the UE may receive a BPSK modulated control channel carrying the SFI. In some examples, the UE may receive the SFI including a transmit power above a threshold transmit power. For example, the communication and processing circuitry 2042, together with the transceiver 2010 and antenna array(s) 2020, shown and described above in connection with FIG. 20 may receive the SFI.

At block 2104, the UE may communicate with the base station in the slot based on the slot format. For example, if the SFI indicates that the slot is a DL half-duplex slot, the UE may receive DL control and/or DL data in the slot. As another example, if the SFI indicates that the slot is an UL half-duplex slot, the UE may transmit UL data and/or UL control in the slot. As yet another example, if the SFI indicates that the slot is a sub-band full-duplex slot, the UE may receive DL control and/or DL data within one or more DL sub-bands of the slot and transmit UL control and/or UL data within one or more UL sub-bands of the slot. In some examples, if the SFI indicates the configuration of one or more symbols of a flexible slot, the UE may transmit and/or receive control and/or data in each symbol of slot based on the configuration of each symbol (e.g., as half-duplex symbols or sub-band full-duplex symbols). For example, the slot format identification circuitry 2044, together with the communication and processing circuitry 2042, transceiver 2010, and antenna array(s) 2020, shown and described above in connection with FIG. 20 may communicate with the base station based on the slot format of the slot.

The process shown in FIG. 21 may include additional aspects, such as any single aspect or any combination of aspects described above and/or in connection with one or more other processes described elsewhere herein.

In one configuration, a UE 2000 includes means for performing the various functions and processes described in relation to FIG. 21. In one aspect, the aforementioned means may be the processor 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 1, 2, 6, 9, and/or 12, and utilizing, for example, the processes and/or algorithms described herein in relation to FIG. 21.

The processes shown in FIGS. 6, 11, 12, 14-19, and 21 may include additional aspects, such as any single aspect or any combination of aspects described below and/or in connection with one or more other processes described elsewhere herein.

Aspect 1: A method of wireless communication at a base station in a wireless communication network, the method comprising: selecting a slot format of a slot comprising a carrier bandwidth, the slot format including one of a half-duplex slot comprising at least a bandwidth part (BWP) of the carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and transmitting a slot format indicator indicating the slot format of the slot to a plurality of user equipment (UEs) within downlink control information or a medium access control (MAC) control element (MAC-CE).

Aspect 2: The method of aspect 1, wherein the slot format indicator is transmitted within the downlink control information of a control channel, and further comprising: applying an aggregation level to the control channel carrying the slot format indicator, wherein the aggregation level is at least a threshold aggregation level.

Aspect 3: The method of aspect 2, further comprising: setting the threshold aggregation level based on at least one of a carrier frequency associated with the carrier bandwidth, a coverage of a cell served by the base station, or a bandwidth of an active downlink bandwidth part.

Aspect 4: The method of aspect 1, 2, or 3, wherein the transmitting the slot format indicator further comprises: transmitting repetitions of the slot format indicator across a plurality of beams within the downlink control information or the MAC-CE.

Aspect 5: The method of aspect 4, further comprising: configuring a plurality of concatenated control resource sets (CORESETs) for transmission of the repetitions of the slot format indicator across the plurality of beams within the downlink control information, wherein each CORESET within the plurality of concatenated CORESETs is associated with transmission of a respective repetition of the slot format indicator on a respective beam of the plurality of beams.

Aspect 6: The method of aspect 5, further comprising: transmitting a concatenation pattern of the plurality of concatenated CORESETs to the plurality of UEs.

Aspect 7: The method of aspect 5 or 6, further comprising: transmitting a configuration of monitoring occasions associated with reception by the plurality of UEs of the repetitions of the slot format indicator on each of the plurality of beams.

Aspect 8: The method of aspect 5, 6, or 7, wherein a respective transmission configuration indicator (TCI) state is associated with each CORESET of the plurality of concatenated CORESETs.

Aspect 9: The method of aspect 1, 2, or 4, further comprising: generating a control channel carrying the slot format indicator in the downlink control information with a number of cyclic redundancy check (CRC) bits greater than a threshold number.

Aspect 10: The method of aspect 9, further comprising: segmenting a payload of the control channel containing the slot format indicator into at least two segments; generating a respective set of segment CRC bits for each of the at least two segments; and generating a set of global CRC bits for the payload and the respective sets of segment CRC bits.

Aspect 11: The method of aspect 1, 2, 4, or 9, further comprising: generating a control channel carrying the slot format indicator in the downlink control information using binary phase shift keying (BPSK) modulation.

Aspect 12: The method of aspect 1, 2, 4, 9, or 11, wherein the transmitting the slot format indicator further comprises: transmitting the slot format indicator at a transmit power above a threshold transmit power.

Aspect 13: The method of aspect 1, 2, or 4, wherein the slot format indicator changes a set of resources in the slot from uplink resources to downlink resources, and further comprising: identifying a group of UEs having respective semi-persistently scheduled or periodically scheduled uplink transmissions within the set of resources, wherein the plurality of UEs corresponds to the group of UEs; and prioritizing transmission of the slot format indicator to the group of UEs.

Aspect 14: The method of aspect 13, wherein the prioritizing transmission of the slot format indicator to the group of UEs further comprises at least one of: applying an aggregation level to a control channel carrying the slot format indicator, wherein the aggregation level is at least a threshold aggregation level based on the group of UEs; or repeating transmission of the slot format indicator across a plurality of beams selected based on the group of UEs within the downlink control information or the MAC-CE.

Aspect 15: The method of aspect 14, wherein the identifying the group of UEs further comprises: selecting, as the group of UEs, a sub-set of a set of UEs having respective semi-persistently scheduled or periodically scheduled uplink transmissions within the set of resources based on the aggregation level, wherein the group of UEs each comprise a respective transmit beam configured to produce a higher level of interference within the set of resources than non-selected UEs of the set of UEs.

Aspect 16: The method of aspect 1 or 13, wherein the slot format indicator changes a set of resources in the slot from uplink resources to downlink resources, and further comprising: adapting the slot format of the slot based on a set of one or more UEs of the plurality of UEs in response to a failure to receive an acknowledgment of the slot format indicator from the set of one or more UEs of the plurality of UEs.

Aspect 17: The method of aspect 16, wherein the adapting the slot format of the slot further comprises: maintaining a selected portion of the uplink resources semi-persistently or periodically scheduled for uplink communication by the set of one or more UEs irrespective of the slot format.

Aspect 18: The method of aspect 16, wherein the adapting the slot format of the slot further comprises: avoiding scheduling downlink transmissions in the set of resources of the slot.

Aspect 19: The method of aspect 1, wherein the transmitting the slot format indicator further comprises: transmitting the slot format indicator within the MAC-CE mapped to a downlink data channel.

Aspect 20: A method of wireless communication at a user equipment in a wireless communication network, the method comprising: receiving, from a base station, a slot format indicator within downlink control information or a medium access control (MAC) control element (MAC-CE), wherein the slot format indicator indicates a slot format of a slot comprising a carrier bandwidth, and the slot format includes one of a half-duplex slot comprising at least a bandwidth part (BWP) of the carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and communicating with the base station in the slot based on the slot format.

Aspect 21: The method of aspect 20, wherein the slot format indicator is received within the downlink control information of a control channel, and wherein an aggregation level of the control channel is at least a threshold aggregation level.

Aspect 22: The method of aspect 20 or 21, wherein the receiving the slot format indicator further comprises: receiving repetitions of the slot format indicator across a plurality of beams within the downlink control information or the MAC-CE.

Aspect 23: The method of aspect 22, wherein the receiving the repetitions of the slot format indicator further comprises: monitoring a plurality of search space sets within at least one monitoring occasion for a plurality of concatenated control resource sets (CORESETs) comprising the repetitions of the slot format indicator within the downlink control information, wherein each CORESET within the plurality of concatenated CORESETs comprises a respective repetition of the slot format indicator on a respective beam of the plurality of beams; and combining the repetitions of the slot format indicator to produce a combined slot format indicator.

Aspect 24: The method of aspect 23, further comprising: receiving a concatenation pattern of the plurality of concatenated CORESETs from the base station.

Aspect 25: The method of aspect 23 or 24, further comprising: receiving a configuration of the at least one monitoring occasion from the base station.

Aspect 26: The method of aspect 23, 24, or 25, wherein a respective transmission configuration indicator (TCI) state is associated with each CORESET of the plurality of concatenated CORESETs.

Aspect 27: The method of aspect 20, 21, or 23, wherein the slot format indicator is received within the downlink control information of a control channel and the control channel comprises a number of cyclic redundancy check (CRC) bits greater than a threshold number.

Aspect 28: The method of aspect 27, wherein the receiving the control channel carrying the slot format indicator further comprises: receiving the control channel comprising at least two segments of a payload containing the slot format indicator, wherein each of the at least two segments comprises a respective set of segment CRC bits and the control channel further comprises a set of global CRC bits.

Aspect 29: The method of aspect 20, 21, 23, or 27, wherein the slot format indicator is received within the downlink control information of a binary phase shift keying (BPSK) modulated control channel.

Aspect 30: The method of aspect 20, 21, 23, 27, or 29, wherein the receiving the slot format indicator further comprises: receiving the slot format indicator comprising a transmit power above a threshold transmit power.

Aspect 31: The method of aspect 20, wherein the slot format indicator is received in the MAC-CE that is mapped to a downlink data channel.

Aspect 32: A apparatus in a wireless communication network comprising a wireless transceiver, a memory, and a processor coupled to the wireless transceiver and the memory, the processor and the memory configured to perform a method of any one of aspects 1 through 19 or aspects 20 through 31.

Aspect 33: An apparatus for wireless communication comprising at least one means for performing a method of any one of aspects 1 through 19 or aspects 20 through 31.

Aspect 34: A non-transitory computer-readable medium having stored therein instructions executable by one or more processors of an apparatus to perform a method of any one of aspects 1 through 19 or aspects 20 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5A, 6, 9, 10, 12, 13, and 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a network element, comprising:
one or more memories; and
one or more processors coupled to the one or more memories, wherein the one or more processors are configured to:
select a slot format of a slot comprising a carrier bandwidth, the slot format including one of a half-duplex slot comprising at least a bandwidth part (BWP) of the carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and
provide a slot format indicator indicating the slot format of the slot for a plurality of user equipment (UEs) at a transmit power above a threshold transmit power and within downlink control information or a medium access control (MAC) control element (MAC-CE).

2. The apparatus of claim 1, wherein the slot format indicator is provided within the downlink control information of a control channel, and wherein the one or more processors are further configured to:
apply an aggregation level to the control channel carrying the slot format indicator, wherein the aggregation level is at least a threshold aggregation level.

3. The apparatus of claim 2, wherein the one or more processors are further configured to:
set the threshold aggregation level based on at least one of a carrier frequency associated with the carrier bandwidth, a coverage of a cell served by the network element, or a bandwidth of an active downlink bandwidth part.

4. The apparatus of claim 1, wherein the one or more processors are further configured to:
transmit repetitions of the slot format indicator across a plurality of beams within the downlink control information or the MAC-CE.

5. The apparatus of claim 4, wherein the one or more processors are further configured to:
configure a plurality of concatenated control resource sets (CORESETs) for transmission of the repetitions of the slot format indicator across the plurality of beams within the downlink control information, wherein each CORESET within the plurality of concatenated CORESETs is associated with transmission of a respective repetition of the slot format indicator on a respective beam of the plurality of beams.

6. The apparatus of claim 5, wherein the one or more processors are further configured to:
transmit a concatenation pattern of the plurality of concatenated CORESETs to the plurality of UEs.

7. The apparatus of claim 5, wherein the one or more processors are further configured to:
transmit a configuration of monitoring occasions associated with reception by the plurality of UEs of the repetitions of the slot format indicator on each of the plurality of beams.

8. The apparatus of claim 5, wherein a respective transmission configuration indicator (TCI) state is associated with each CORESET of the plurality of concatenated CORESETs.

9. The apparatus of claim 1, wherein the one or more processors are further configured to:
generate a control channel carrying the slot format indicator in the downlink control information with a number of cyclic redundancy check (CRC) bits greater than a threshold number.

10. The apparatus of claim 9, wherein the one or more processors are further configured to:
segment a payload of the control channel containing the slot format indicator into at least two segments;
generate a respective set of segment CRC bits for each of the at least two segments; and
generate a set of global CRC bits for the payload and the respective sets of segment CRC bits.

11. The apparatus of claim 1, wherein the one or more processors are further configured to:
generate a control channel carrying the slot format indicator in the downlink control information using binary phase shift keying (BPSK) modulation.

12. The apparatus of claim 1, wherein the slot format indicator changes a set of resources in the slot from uplink resources to downlink resources, and wherein the one or more processors are further configured to:
identify a group of UEs having respective semi-persistently scheduled or periodically scheduled uplink transmissions within the set of resources, wherein the plurality of UEs corresponds to the group of UEs; and
prioritize transmission of the slot format indicator to the group of UEs.

13. The apparatus of claim 12, wherein the one or more processors are further configured to perform at least one of:
apply an aggregation level to a control channel carrying the slot format indicator, wherein the aggregation level is at least a threshold aggregation level based on the group of UEs; or
repeat transmission of the slot format indicator across a plurality of beams selected based on the group of UEs within the downlink control information or the MAC-CE.

14. The apparatus of claim 13, wherein the one or more processors are further configured to:
select, as the group of UEs, a sub-set of a set of UEs having respective semi-persistently scheduled or periodically scheduled uplink transmissions within the set of resources based on the aggregation level, wherein the group of UEs each comprise a respective transmit beam configured to produce a higher level of interference within the set of resources than non-selected UEs of the set of UEs.

15. The apparatus of claim 1, wherein the slot format indicator changes a set of resources in the slot from uplink resources to downlink resources, and wherein the one or more processors are further configured to:
adapt the slot format of the slot based on a set of one or more UEs of the plurality of UEs in response to a failure to receive an acknowledgment of the slot format indicator from the set of one or more UEs of the plurality of UEs.

16. The apparatus of claim 15, wherein the one or more processors are further configured to adapt the slot format by:
maintaining a selected portion of the uplink resources semi-persistently or periodically scheduled for uplink communication by the set of one or more UEs irrespective of the slot format, or
avoiding scheduling downlink transmissions in the set of resources of the slot.

17. The apparatus of claim 1, wherein the one or more processors are further configured to:
transmit the slot format indicator within the MAC-CE mapped to a downlink data channel.

18. A method of wireless communication at a network element, the method comprising:
selecting a slot format of a slot comprising a carrier bandwidth, the slot format including one of a half-duplex slot comprising at least a bandwidth part (BWP) of the carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and
providing a slot format indicator indicating the slot format of the slot for a plurality of user equipment (UEs) at a transmit power above a threshold transmit power within downlink control information or a medium access control (MAC) control element (MAC-CE).

19. An apparatus for wireless communication at a user equipment (UE), comprising:
one or more memories; and one or more processors coupled to the one or more memories, wherein the one or more processors are configured to:
receive, from a network element, a slot format indicator at a transmit power above a threshold transmit power and within downlink control information or a medium access control (MAC) control element (MAC-CE), wherein the slot format indicator indicates a slot format of a slot, and the slot format includes one of a half-duplex slot comprising at least a bandwidth part (BWP) of a carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and
communicate with the network element in the slot based on the slot format.

20. The apparatus of claim 19, wherein the slot format indicator is received within the downlink control information of a control channel, and wherein an aggregation level of the control channel is at least a threshold aggregation level.

21. The UE apparatus of claim 19, wherein the one or more processors are further configured to:
receive repetitions of the slot format indicator across a plurality of beams within the downlink control information or the MAC-CE.

22. The apparatus of claim 21, wherein the one or more processors are further configured to:
monitor a plurality of search space sets within at least one monitoring occasion for a plurality of concatenated control resource sets (CORESETs) comprising the repetitions of the slot format indicator within the downlink control information, wherein each CORESET within the plurality of concatenated CORESETs comprises a respective repetition of the slot format indicator on a respective beam of the plurality of beams; and
combine the repetitions of the slot format indicator to produce a combined slot format indicator.

23. The apparatus of claim 22, wherein the one or more processors are further configured to perform at least one of:
receive a concatenation pattern of the plurality of concatenated CORESETs from the network element, or
receive a configuration of the at least one monitoring occasion from the network element.

24. The apparatus of claim 22, wherein a respective transmission configuration indicator (TCI) state is associated with each CORESET of the plurality of concatenated CORESETs.

25. The apparatus of claim 19, wherein the slot format indicator is received within the downlink control information of a control channel and the control channel comprises a number of cyclic redundancy check (CRC) bits greater than a threshold number, and wherein the one or more processors are further configured to:
receive the control channel comprising at least two segments of a payload containing the slot format indicator, wherein each of the at least two segments comprises a respective set of segment CRC bits and the control channel further comprises a set of global CRC bits.

26. The apparatus of claim 19, wherein the slot format indicator is received within the downlink control information of a binary phase shift keying (BPSK) modulated control channel.

27. The apparatus of claim 19, wherein the slot format indicator is received in the MAC-CE that is mapped to a downlink data channel.

28. A method of wireless communication at a user equipment, the method comprising:
receiving, from a network element, a slot format indicator at a transmit power above a threshold transmit power and within downlink control information or a medium access control (MAC) control element (MAC-CE), wherein the slot format indicator indicates a slot format of a slot comprising a carrier bandwidth, and the slot format includes one of a half-duplex slot comprising at least a bandwidth part (BWP) of the carrier bandwidth configured for uplink transmission or downlink transmission, a sub-band full-duplex slot comprising at least the BWP configured for simultaneous uplink transmission and downlink transmission, or a flexible slot comprising at least one flexible symbol configurable as a half-duplex symbol or a sub-band full-duplex symbol; and
communicating with the network element in the slot based on the slot format.

* * * * *